(12) United States Patent
Yoshida et al.

(10) Patent No.: US 11,156,403 B2
(45) Date of Patent: Oct. 26, 2021

(54) GRAPHITE-CONTAINING REFRACTORY AND METHOD OF PRODUCING GRAPHITE-CONTAINING REFRACTORY

(71) Applicant: JFE Steel Corporation, Tokyo (JP)

(72) Inventors: Keisuke Yoshida, Tokyo (JP); Hisahiro Matsunaga, Tokyo (JP); Yoichiro Hama, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 16/487,248

(22) PCT Filed: Feb. 1, 2018

(86) PCT No.: PCT/JP2018/003333
§ 371 (c)(1),
(2) Date: Aug. 20, 2019

(87) PCT Pub. No.: WO2018/155118
PCT Pub. Date: Aug. 30, 2018

(65) Prior Publication Data
US 2019/0368815 A1    Dec. 5, 2019

(30) Foreign Application Priority Data

Feb. 24, 2017 (JP) .............................. JP2017-033126

(51) Int. Cl.
*F27D 1/00* (2006.01)
*C04B 35/04* (2006.01)
(Continued)

(52) U.S. Cl.
CPC .......... *F27D 1/0006* (2013.01); *C04B 35/043* (2013.01); *C04B 35/103* (2013.01);
(Continued)

(58) Field of Classification Search
CPC ..... F27D 1/0009; F27D 1/002; C04B 35/043; C04B 35/083; C04B 35/80; C04B 35/103
See application file for complete search history.

(56) References Cited

U.S. PATENT DOCUMENTS 5,177,039 A    6/1993    Allaire et al.
5,389,716 A    2/1995    Graves
(Continued)

FOREIGN PATENT DOCUMENTS

CN    1058618 A    2/1992
CN    102459722 A    5/2012
(Continued)

OTHER PUBLICATIONS

Russian Office action dated Mar. 27, 2020, of counterpart Russian Application No. 2019126662, along with an English translation.
(Continued)

*Primary Examiner* — Karl E Group
(74) *Attorney, Agent, or Firm* — DLA Piper LLP (US)

(57) ABSTRACT

A graphite-containing refractory has higher bending strength and fracture energy than known refractories. The graphite-containing refractory has a graphite content of 1% to 80% by mass. 1000 to 300000 carbon fibers with a fiber diameter of 1 to 45 μm/fiber are bundled. The carbon fiber bundle has a length of 100 mm or more and is placed within the graphite-containing refractory to form the same.

13 Claims, 7 Drawing Sheets

(51) Int. Cl.
*C04B 35/103* (2006.01)
*C04B 35/567* (2006.01)
*C04B 35/622* (2006.01)
*C04B 35/626* (2006.01)
*C04B 35/63* (2006.01)
*C04B 35/634* (2006.01)
*C04B 35/636* (2006.01)
*C04B 35/82* (2006.01)
*C04B 35/83* (2006.01)
*C04B 35/043* (2006.01)
*C04B 35/52* (2006.01)
*C04B 35/80* (2006.01)

(52) U.S. Cl.
CPC ........ *C04B 35/52* (2013.01); *C04B 35/62204* (2013.01); *C04B 35/62655* (2013.01); *C04B 35/6303* (2013.01); *C04B 35/636* (2013.01); *C04B 35/6316* (2013.01); *C04B 35/63476* (2013.01); *C04B 35/63496* (2013.01); *C04B 35/80* (2013.01); *C04B 35/82* (2013.01); *C04B 35/83* (2013.01); *C04B 2235/3206* (2013.01); *C04B 2235/3217* (2013.01); *C04B 2235/3418* (2013.01); *C04B 2235/3826* (2013.01); *C04B 2235/425* (2013.01); *C04B 2235/526* (2013.01); *C04B 2235/5248* (2013.01); *C04B 2235/5264* (2013.01); *C04B 2235/604* (2013.01); *C04B 2235/606* (2013.01)

(56) References Cited

U.S. PATENT DOCUMENTS

| | | | |
|---|---|---|---|
| 5,418,063 A | 5/1995 | Booth | |
| 5,439,627 A | 8/1995 | De Jager | |
| 6,261,981 B1 | 7/2001 | Dietrich et al. | |
| 2004/0207133 A1 | 10/2004 | Williams et al. | |
| 2009/0291278 A1* | 11/2009 | Kawabe | B29C 43/305 428/213 |
| 2010/0059719 A1* | 3/2010 | Ohno | C08J 5/24 252/511 |
| 2011/0200819 A1* | 8/2011 | Baba | G21B 1/13 428/367 |
| 2012/0088104 A1 | 4/2012 | Hashimoto et al. | |

FOREIGN PATENT DOCUMENTS

| | | |
|---|---|---|
| CN | 102858712 A | 1/2013 |
| EP | 2 977 126 A1 | 1/2016 |
| JP | 7-206535 A | 8/1995 |
| JP | 8-259311 A | 10/1996 |
| JP | 2005-320196 A | 11/2005 |
| JP | 2007-106618 A | 4/2007 |
| JP | 2013-1606 A | 1/2013 |
| RU | 2184715 C2 | 7/2002 |
| RU | 2337083 C2 | 10/2008 |
| TW | 201510194 A | 3/2015 |

OTHER PUBLICATIONS

Office Action dated Sep. 25, 2020, of counterpart European Application No. 18757658.2.
The Extended European Search Report dated Dec. 17, 2019, of counterpart European Application No. 18757658.2.
Office Action dated Feb. 10, 2021, of counterpart European Application No. 18757658.2.
Office Action dated Feb. 19, 2021, of counterpart Korean Application No. 10-2019-7024278, along with a Concise Statement of Relevance of Office Action in English.
The First Office Action dated Jun. 16, 2021, of counterpart Chinese Application No. 201880013645.5, along with an English translation.
The Korean Office Action dated Jul. 29, 2021, of counterpart Korean Application No. 10-2019-7024278, along with a Concise Statement of Relevance in English.

* cited by examiner

FIG. 10(a)  FIG. 10(b)  FIG. 10(c)
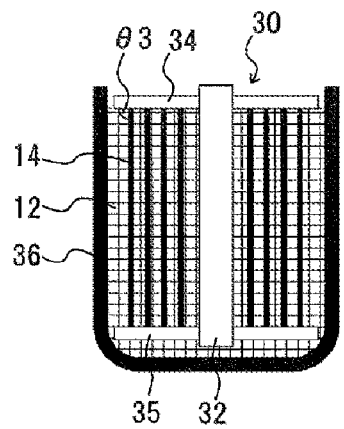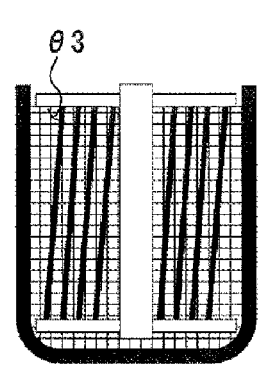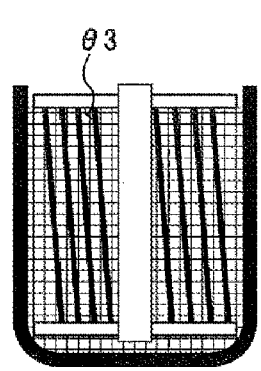
FIG. 11
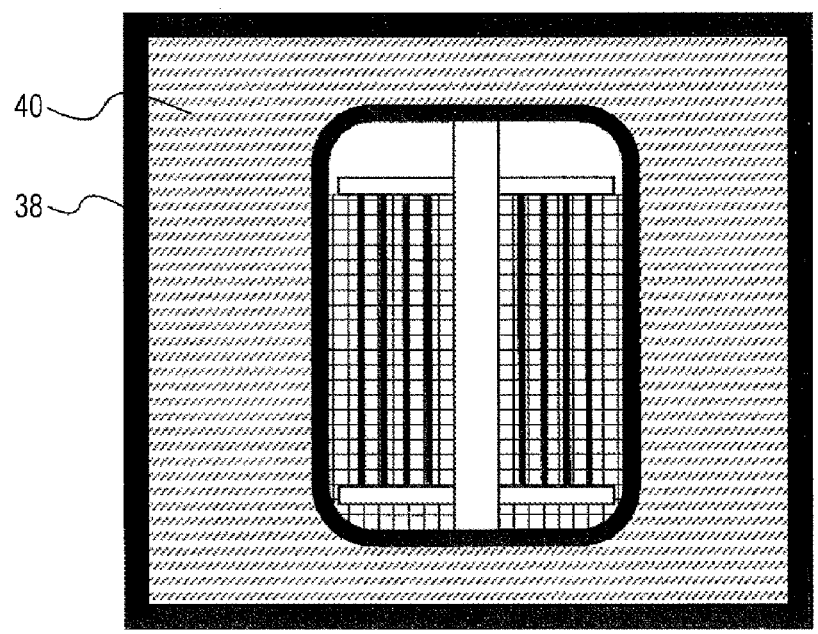
FIG. 12(a)  FIG. 12(b)  FIG. 12(c)
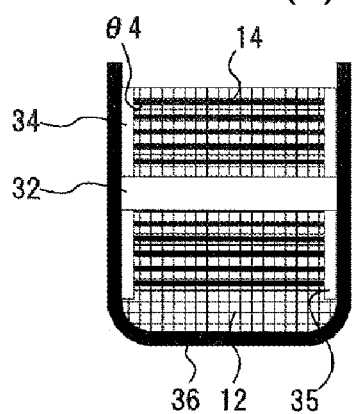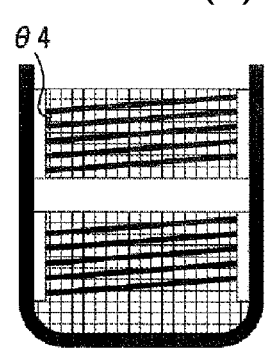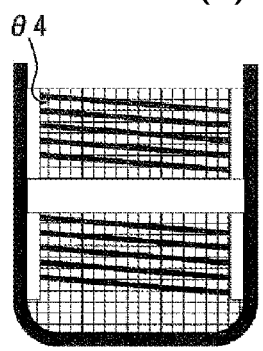

GRAPHITE-CONTAINING REFRACTORY AND METHOD OF PRODUCING GRAPHITE-CONTAINING REFRACTORY

TECHNICAL FIELD

This disclosure relates to a graphite-containing refractory within which a carbon fiber bundle is placed and a method of producing the graphite-containing refractory.

BACKGROUND

Equipment (refining vessels, transfer vessels and the like) used in an iron making process or a steelmaking process in steelworks has a refractory lining to withstand its use under high temperatures for extended periods. Magnesia carbon refractories are used in converters in a refining process. Torpedoes and hot metal ladles used in a hot metal pretreatment process are lined with an alumina-silicon carbide-carbon refractory. These refractories are used under very severe conditions, including mechanical impacts during charging, abrasion by agitation of molten steel and molten slag, slag erosion by molten slag, and sudden temperature changes in operation. Thus, using durable refractories that can withstand severe conditions are desirable for stable operation.

Japanese Unexamined Patent Application Publication No. 2005-320196 discloses, as a technique to improve durability of a refractory, a refractory within which a rod-like or net-like high-strength fiber bundle is stiffened with a synthetic resin or the like and is placed without deformation of the high-strength fiber bundle. It states that placing the high-strength fiber bundle within the refractory without deformation can improve the mechanical strength and spalling resistance of the refractory. Japanese Unexamined Patent Application Publication No. 2007-106618 discloses a refractory in which a unidirectional bundle, twine, or fabric made of high tensile fibers is bonded to part or all of the surface of the refractory with a heat-resistant adhesive. It states that such a unidirectional bundle, twine, or fabric made of high tensile fibers bonded to part or all of the surface of the refractory can improve the tensile strength, reduce the occurrence of cracks or fracture, and thereby prolong the life of the refractory.

Carbon fibers placed in the refractories disclosed in Japanese Unexamined Patent Application Publication No. 2005-320196 and Japanese Unexamined Patent Application Publication No. 2007-106618 have a length of 90 mm or less, and the refractories have insufficient strength as refractories for use in converters or the like exposed to severe conditions. It could therefore be helpful to provide a graphite-containing refractory having higher bending strength and requiring higher energy to be destroyed (hereinafter referred to as "fracture energy") than known refractories and a method of producing the graphite-containing refractory.

SUMMARY

We thus provide:

(1) A graphite-containing refractory with a graphite content of 1% to 80% by mass, containing a carbon fiber bundle 100 mm or more in length placed therein, the carbon fiber bundle being formed of 1000 to 300000 carbon fibers with a fiber diameter of 1 to 45 μm/fiber.

(2) The graphite-containing refractory according to (1), wherein the carbon fiber bundle is formed of 1000 to 60000 of the carbon fibers.

(3) The graphite-containing refractory according to (1) or (2), containing a magnesia raw material constituting 20% to 99% by mass of the graphite-containing refractory.

(4) The graphite-containing refractory according to (1) or (2), containing an alumina raw material constituting 10% to 95% by mass of the graphite-containing refractory and a silicon carbide raw material constituting 1% or more by mass of the graphite-containing refractory.

(5) The graphite-containing refractory according to (4), further containing a silica raw material constituting 1% to 50% by mass of the graphite-containing refractory.

(6) The graphite-containing refractory according to (1) or (2), containing a refractory waste constituting 10% to 90% by mass of the graphite-containing refractory, the refractory waste being a crushed used refractory.

(7) The graphite-containing refractory according to any one of (1) to (6), wherein the carbon fiber bundle is formed by bonding using at least one adhesive selected from a phenolic resin, an alumina sol, a silica sol, pitch, and tar.

(8) The graphite-containing refractory according to any one of (1) to (6), wherein the carbon fiber bundle is formed by bonding using at least one adhesive selected from a phenolic resin, an epoxy resin, a melamine resin, a urea resin, an alkyd resin, an unsaturated polyester resin, polyurethane, thermosetting polyimide, an alumina sol, a silica sol, a zirconia sol, a chromia sol, a titania sol, a magnesia sol, a calcia sol, an yttria sol, pitch, tar, and a starch paste.

(9) The graphite-containing refractory according to any one of (1) to (8), further containing short carbon fibers constituting 0.10% to 10% by mass based on 100% by mass of the graphite-containing refractory, the short carbon fibers having a fiber diameter of 1 to 45 μm/fiber, a fiber length of 1 mm or less, and a ratio of fiber length to fiber diameter (fiber length/fiber diameter) of 2 to 1000.

(10) A method of producing a graphite-containing refractory within which a carbon fiber bundle is placed, the graphite constituting 1% to 80% by mass, the method including: a bundling step of bundling carbon fibers to form the carbon fiber bundle; a mixing step of mixing a refractory raw material with graphite to prepare a graphite-containing refractory raw material; a pressing step of pressing the graphite-containing refractory raw material in which the carbon fiber bundle is placed to prepare a pressed product; and a drying step of drying the pressed product, wherein the bundling step includes bundling 1000 to 300000 of the carbon fibers with a fiber diameter of 1 to 45 μm/fiber to form a carbon fiber bundle 100 mm or more in length.

(11) The method of producing a graphite-containing refractory according to (10), wherein the bundling step includes bundling 1000 to 60000 of the carbon fibers.

(12) The method of producing a graphite-containing refractory according to (10) or (11), wherein the refractory raw material is a magnesia raw material, and the mixing step includes adding 20% to 99% by mass of the magnesia raw material.

(13) The method of producing a graphite-containing refractory according to (10) or (11), wherein the refractory raw material includes an alumina raw material and a silicon carbide raw material, and the mixing step includes adding 10% to 95% by mass of the alumina raw material and adding the silicon carbide raw material at 1% or more by mass.

(14) The method of producing a graphite-containing refractory according to (13), wherein the refractory raw material includes an alumina raw material, a silicon carbide raw material, and a silica raw material, the mixing step includes adding 10% to 95% by mass of the alumina raw material, adding the silicon carbide raw material at 1% or more by mass, and adding 1% to 50% by mass of the silica raw material.

(15) The method of producing a graphite-containing refractory according to (10) or (11), wherein the refractory raw material is a refractory waste, which is a crushed used refractory, and the mixing step includes adding 10% to 90% by mass of the refractory waste.

(16) The method of producing a graphite-containing refractory according to any one of (10) to (15), wherein the bundling step includes bonding the carbon fibers with at least one adhesive selected from a phenolic resin, an alumina sol, a silica sol, pitch, and tar.

(17) The method of producing a graphite-containing refractory according to any one of (10) to (15), wherein the bundling step includes bonding the carbon fibers with at least one adhesive selected from a phenolic resin, an epoxy resin, a melamine resin, a urea resin, an alkyd resin, an unsaturated polyester resin, polyurethane, thermosetting polyimide, an alumina sol, a silica sol, a zirconia sol, a chromia sol, a titania sol, a magnesia sol, a calcia sol, an yttria sol, pitch, tar, and a starch paste.

(18) The method of producing a graphite-containing refractory according to any one of (10) to (17), further including, before the pressing step: a kneading step of kneading the graphite-containing refractory raw material; and a filling step of filling a mold to press the graphite-containing refractory raw material with the kneaded graphite-containing refractory raw material and the carbon fiber bundle.

(19) The method of producing a graphite-containing refractory according to (18), wherein the filling step includes filling 5% or more by volume of the mold with the graphite-containing refractory raw material, then placing the carbon fiber bundle at intervals of 3 mm or more, and repeatedly performing the filling and the placing to fill the mold with the graphite-containing refractory raw material and the carbon fiber bundle.

(20) The method of producing a graphite-containing refractory according to any one of (10) to (17), further including, before the pressing step: a kneading step of kneading the graphite-containing refractory raw material; and a filling step of filling a pressing vessel to press the graphite-containing refractory raw material with the kneaded graphite-containing refractory raw material and the carbon fiber bundle, wherein the pressing step includes applying pressure to the pressing vessel via a pressure medium to prepare a pressed product.

(21) The method of producing a graphite-containing refractory according to any one of (10) to (20), wherein the mixing step includes adding short carbon fibers constituting 0.10% to 10% by mass based on 100% by mass of the graphite-containing refractory raw material, the short carbon fibers having a fiber diameter of 1 to 45 µm, a fiber length of 1 mm or less, and a ratio of fiber length to fiber diameter (fiber length/fiber diameter) of 2 to 1000.

A graphite-containing refractory with higher bending strength and fracture energy than before can be produced by placing a carbon fiber bundle 100 mm or more in length within the graphite-containing refractory. The use of such a graphite-containing refractory with higher bending strength and fracture energy, for example, as a converter refractory enables stable converter operation and can prolong the life of the graphite-containing refractory.

BRIEF DESCRIPTION OF THE DRAWINGS

FIGS. 10(a)-10(c) include schematic cross-sectional views illustrating the charge angles of carbon fiber bundles in Examples 9-1 to 9-3.

FIG. 11 is a schematic cross-sectional view of the state of pressing by a CIP apparatus.

FIGS. 12(a)-12(c) include schematic cross-sectional views illustrating the charge angles of carbon fiber bundles in Examples 10-1 to 10-3.

Figure 1A:
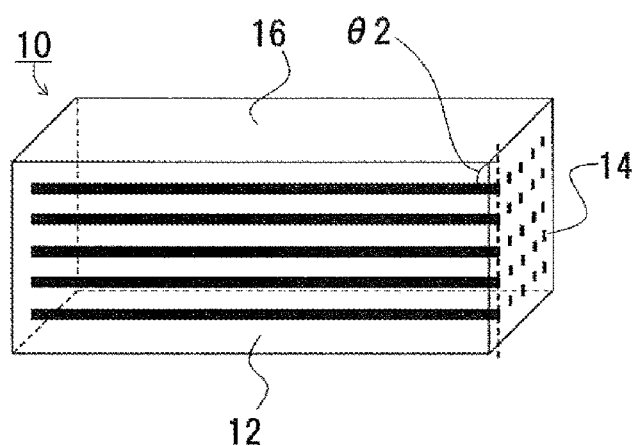
FIGS. 1(a) and 1(b) include a perspective view and a side view of a magnesia carbon refractory according to an example.

REFERENCE SIGNS LIST 10 magnesia carbon refractory
12 magnesia carbon raw material
14 carbon fiber bundle
16 pressing surface
18 dotted line
20 arrow
30 supporting member
32 core metal
34 upper supporting plate
35 lower supporting plate
36 pressing vessel
38 CIP apparatus
40 pressure medium
50 high-frequency induction furnace
52 induction coil
54 bottom plate
56 molten iron
58 synthetic slag
60 graphite-containing refractory

DETAILED DESCRIPTION

Magnesia carbon refractories used to line converters are used under very severe conditions, including mechanical impacts during charging, abrasion by agitation of molten steel and molten slag, slag erosion by molten slag, and sudden temperature changes in the operation of the converters. Thus, it is required to use magnesia carbon refractories that can withstand such severe conditions for stable operation. Likewise, alumina-silicon carbide-carbon refractories used to line molten iron preliminary treatment vessels such as torpedoes or hot metal ladles, are also used under very severe conditions. Thus, durable alumina-silicon carbide-carbon refractories that can withstand these conditions are preferably used.

We found that placing a carbon fiber bundle 100 mm or more in length composed of 1000 to 300000 carbon fibers with a fiber diameter of 1 to 45 µm/fiber within a graphite-containing refractory can improve the bending strength and fracture energy of the refractory compared to known graphite-containing refractories. Our methods are further described below with an example of a magnesia carbon refractory.

Figure 1B:
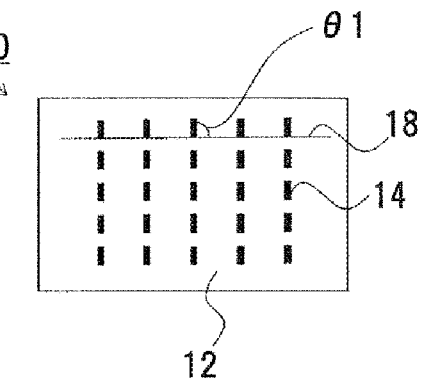

FIGS. 1(a) and 1(b) include a perspective view and a side view of a magnesia carbon refractory 10 according to an example. FIG. 1(a) is a perspective view of the magnesia carbon refractory 10, and FIG. 1(b) is a side view of the magnesia carbon refractory 10. The magnesia carbon refractory 10 includes a plurality of carbon fiber bundles 14 placed in the longitudinal direction within a magnesia carbon raw material 12, which is a mixture of graphite and a magnesia raw material. This increases the bending strength and fracture energy of the magnesia carbon refractory 10.

The graphite constitutes 1% to 80% by mass of the magnesia carbon refractory 10, and the magnesia raw material constitutes 20% to 99% by mass of the magnesia carbon refractory 10. This can prevent cracking of the refractory caused by thermal spalling and improve resistance to erosion by converter slag. By contrast, a graphite content of less than 1% by mass results in cracking of the refractory caused by thermal spalling and results in significantly decreased crack resistance. A magnesia raw material content of less than 20% by mass results in decreased resistance to erosion by converter slag and results in increased erosion.

Figure 2:
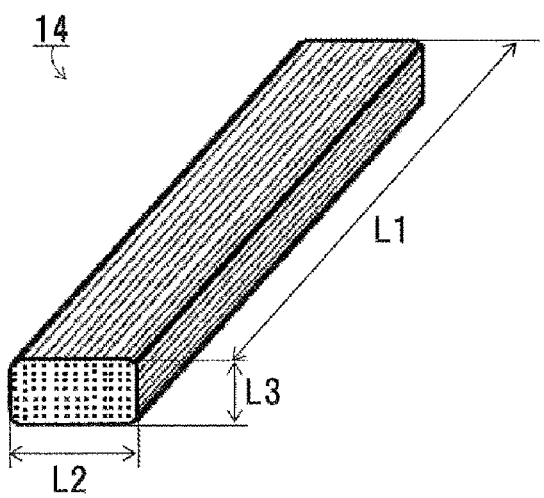
FIG. 2 is a perspective view of a carbon fiber bundle.

FIG. 2 is a perspective view of one of the carbon fiber bundles 14. The carbon fiber bundle 14 is formed by bundling a plurality of carbon fibers. The carbon fiber bundle 14 has a length L1 of 100 mm or more, which is smaller than or equal to the length of the magnesia carbon refractory 10 in the longitudinal direction of the carbon fiber bundles 14 placed within the magnesia carbon refractory 10. The carbon fiber bundle 14 is composed of 1000 to 300000 carbon fibers with a fiber diameter of 1 to 45 µm/fiber, the fibers being bundled so that an end face of the carbon fiber bundle 14 has a width L2 of 1.0 to 20.0 mm and a thickness L3 of 0.001 to 6.0 mm, where L2 is longer than L3.

As shown above, in this example, the carbon fiber bundle 14 is formed by bundling 1000 to 300000 carbon fibers with a fiber diameter of 1 to 45 µm/fiber. This produces the suppressive effect of the carbon fiber bundles 14 on the development of a crack at the portion where the carbon fiber bundles 14 are placed and increases the bending strength and fracture energy of the magnesia carbon refractory 10. By contrast, when the carbon fibers have a fiber diameter of less than 1 µm/fiber, and the number of carbon fibers is less than 1000, the carbon fiber bundle is too narrow to prevent the development of a crack and to increase the bending strength and fracture energy. When the carbon fibers have a fiber diameter of more than 45 µm/fiber, and the number of carbon fibers is more than 300000, the carbon fiber bundle is so thick that entanglements between the carbon fiber bundles and the refractory raw material deteriorate, thus causing spring back during pressing and making the pressing difficult. The carbon fiber bundle 14 may be formed by bundling 1000 to 60000 carbon fibers.

The carbon fiber bundle 14 is preferably formed by bonding a bundle of the carbon fiber with at least one adhesive selected from a phenolic resin, an epoxy resin, a melamine resin, a urea resin, an alkyd resin, an unsaturated polyester resin, polyurethane, thermosetting polyimide, an alumina sol, a silica sol, a zirconia sol, a chromia sol, a titania sol, a magnesia sol, a calcia sol, an yttria sol, pitch, tar, and a starch paste. Bonding a bundle of carbon fiber can improve adhesion between the carbon fibers and adhesion between the carbon fiber bundle and the refractory raw material, densify the pressed product, and thereby increase the bending strength and fracture energy of the magnesia carbon refractory 10.

The width L2 of an end face of the carbon fiber bundle 14 is longer than the thickness L3 of the end face. Such a flat shape with the width L2 of an end face of the carbon fiber bundle 14 being longer than the thickness L3 of the end face can impart anisotropy to the bending strength of the carbon fiber bundle 14. When the carbon fiber bundles 14 with such anisotropic bending strength are unidirectionally placed within the refractory, the magnesia carbon refractory 10 also has anisotropic bending strength.

The magnesia carbon refractory 10 is a refractory produced by being press-formed in the direction perpendicular to the pressing surface 16. As illustrated in FIGS. 1(a) and 1(b), the carbon fiber bundles 14 are placed such that the longitudinal directions of end faces of the carbon fiber bundles 14 are the same and the angle θ1 between the pressing surface 16 and the longitudinal direction of each end face is 90 degrees. In FIG. 1(b), the dotted line 18 is a line parallel to the pressing surface 16 drawn to indicate the angle θ1 between the pressing surface 16 and the longitudinal direction of end faces of the carbon fiber bundles 14.

When the carbon fiber bundles 14 are placed in this manner such that the longitudinal direction of end faces of the carbon fiber bundles 14 are the same and the angle θ1 between the longitudinal direction of each end face and the pressing surface 16 is 90 degrees, this enables the magnesia carbon raw material 12 to easily enter between the carbon fiber bundles 14 during pressing and thereby improves formability of the magnesia carbon refractory 10. Furthermore, placing the carbon fiber bundles 14 such that the longitudinal directions of the end faces are the same also imparts anisotropy to the bending strength of the magnesia carbon refractory 10, and placing the carbon fiber bundles 14 such that the angle θ1 between each longitudinal direction and the pressing surface 16 is 90 degrees can increase the bending strength in the longitudinal direction of the end faces of the carbon fiber bundles 14 compared to the bending strength in the longitudinal direction of the end faces of the carbon fiber bundles 14 in the magnesia carbon refractory 10. Although the angle θ1 between the longitudinal direction and the pressing surface 16 is preferably 90 degrees, the angle θ1 may be approximately 90±45 degrees in consideration of precision in workability.

Figure 3:
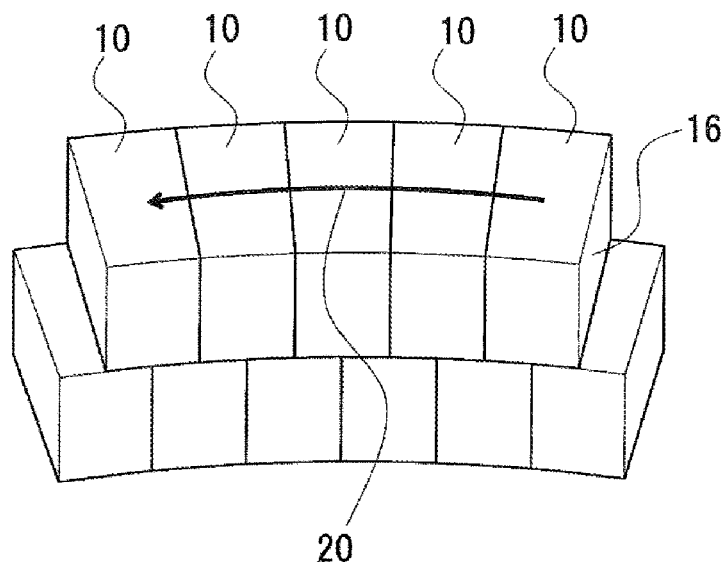
FIG. 3 is a schematic perspective view of the magnesia carbon refractory used as a converter refractory.

FIG. 3 is a schematic perspective view of the magnesia carbon refractory 10 used as a converter refractory. As illustrated in FIG. 3, when the magnesia carbon refractories 10 are used in a converter, the magnesia carbon refractories 10 are placed such that the direction of the pressing surfaces 16 is along the circumferential direction of the converter (the arrow 20 in FIG. 3). In this example, the magnesia carbon refractory 10 expands and contracts repeatedly due to sudden temperature changes in the operation of the converter, thereby causing stress in the circumferential direction, that is, in the direction perpendicular to the pressing surfaces 16.

As described above, the magnesia carbon refractory 10 according to this example has anisotropic bending strength, and the bending strength perpendicular to the pressing surface 16 is higher than the bending strength parallel to the pressing surface 16. Thus, the magnesia carbon refractories 10 have the pressing surfaces 16 whose direction is along the circumferential direction in which stress is caused in the converter and thereby have high bending strength against the stress caused in the converter. Placing the magnesia carbon refractory 10 with anisotropic bending strength such that the direction in which the bending strength is higher is the stress direction in the converter can improve the durability of the magnesia carbon refractory 10.

As illustrated in FIGS. 1(a) and 1(b), the magnesia carbon refractory 10 according to this example is placed such that the angle θ2 between the direction perpendicular to the pressing surface 16 of the magnesia carbon refractory 10 and the direction along the length L1 of the carbon fiber bundle 14 is 90 degrees. The bending strength and fracture energy of the magnesia carbon refractory 10 toward the force in the direction perpendicular to the pressing surface 16 are higher when the carbon fiber bundles 14 are placed in this way than when the carbon fiber bundles 14 are placed such that the direction perpendicular to the pressing surface 16 is parallel to the direction along the length L1 of the carbon fiber bundle 14.

Figure 4A:
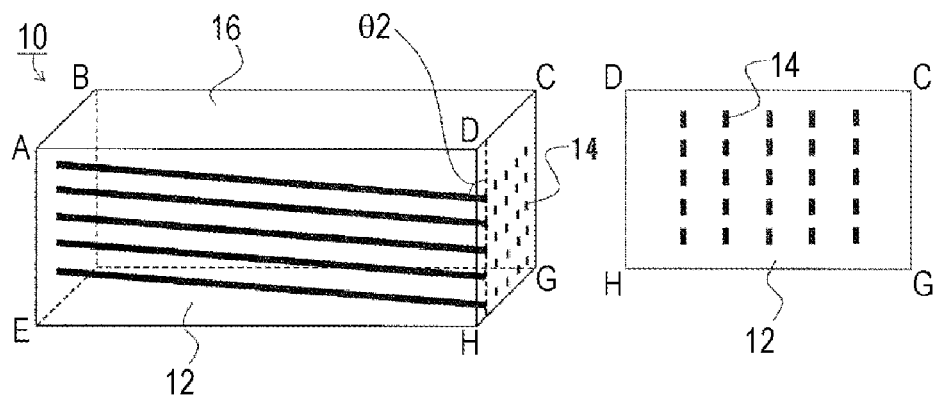
FIGS. 4(a) and 4(b) include a perspective view and a side view of the magnesia carbon refractory in which the angle θ2 between the direction perpendicular to the pressing surface of the magnesia carbon refractory and the direction along the length L1 of the carbon fiber bundle is 45 degrees.
Figure 4B:
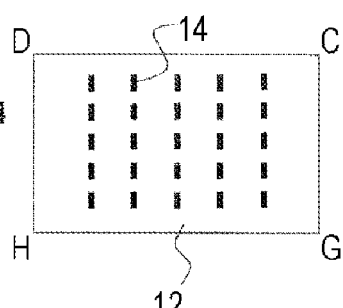
Figure 5A:
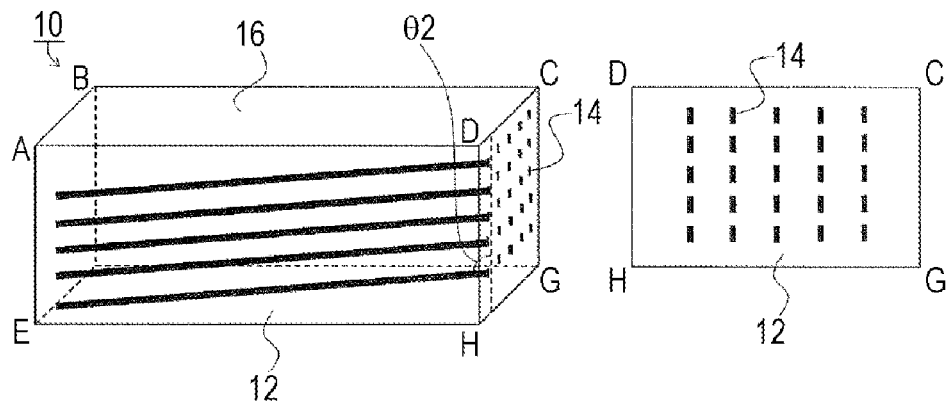
FIGS. 5(a) and 5(b) include a perspective view and a side view of the magnesia carbon refractory in which the angle θ2 between the direction perpendicular to the pressing surface of the magnesia carbon refractory and the direction along the length L1 of the carbon fiber bundle is 135 degrees.
Figure 5B:
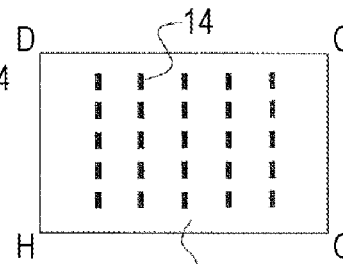

FIGS. 4(a) and 4(b) include a perspective view and a side view of the magnesia carbon refractory 10 in which the angle θ2 between the direction perpendicular to the pressing surface 16 of the magnesia carbon refractory 10 and the direction along the length L1 of the carbon fiber bundle 14 is 45 degrees. FIGS. 5(a) and 5(b) include a perspective view and a side view of the magnesia carbon refractory 10 in which the angle θ2 between the direction perpendicular to the pressing surface 16 of the magnesia carbon refractory 10 and the direction along the length L1 of the carbon fiber bundle 14 is 135 degrees. As illustrated in FIGS. 4(a) and 4(b) and 5(a) and 5(b), the carbon fiber bundles 14 are preferably placed such that the angle θ2 between the direction perpendicular to the pressing surface 16 of the magnesia carbon refractory 10 and the direction along the length L1 of the carbon fiber bundle 14 is 45 to 135 degrees. This can increase the bending strength and fracture energy of the magnesia carbon refractory 10 compared to when the carbon fiber bundles 14 are placed such that the direction perpendicular to the pressing surface 16 of the magnesia carbon refractory 10 is parallel to the direction along the length L1 of the carbon fiber bundle 14. Although the carbon fiber bundles 14 are parallel to each other and are parallel to the face AEHD in FIGS. 4(a) and 4(b) and 5(a) and 5(b), the bending strength and fracture energy of the magnesia carbon refractory 10 are increased as long as the angles θ1 and θ2 are 45 to 135 degrees even if the carbon fiber bundles 14 are not parallel to each other.

The magnesia carbon refractory 10 may further contain short carbon fibers constituting 0.10% to 10% by mass based on 100% by mass of the magnesia carbon raw material 12. The short carbon fibers have a fiber diameter of 1 to 45 μm/fiber, a fiber length of 1 mm or less, and a ratio of fiber length to fiber diameter (fiber length/fiber diameter) of 2 to 1000. The short carbon fibers restrict the development of a crack in the magnesia carbon refractory 10 and thereby increase the bending strength and fracture energy of the magnesia carbon refractory 10.

Figure 6:
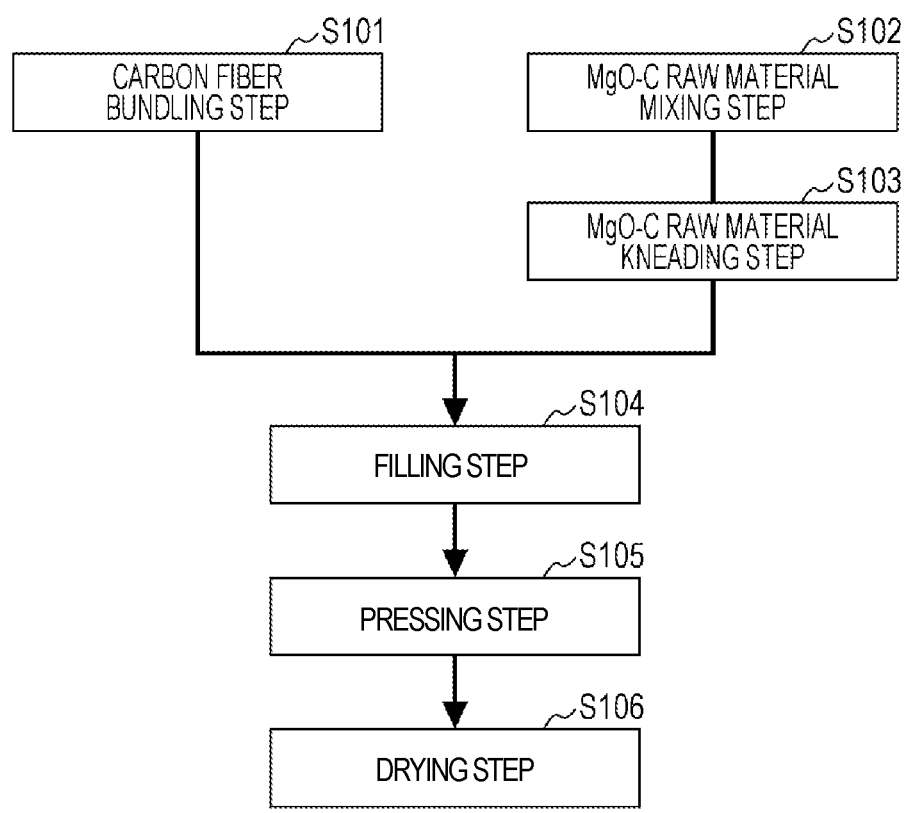
FIG. 6 is a production flow diagram of the magnesia carbon refractory according to an example.

FIG. 6 is a production flow diagram of the magnesia carbon refractory 10 according to the example. A method of producing the magnesia carbon refractory 10 is described below with reference to FIG. 6. The magnesia carbon refractory 10 is produced through a carbon fiber bundling step, a magnesia carbon raw material 12 mixing step, a magnesia carbon raw material 12 kneading step, a filling step, a pressing step, and a drying step.

In the carbon fiber bundling step (S101), for example, a commercially available carbon fiber fabric with a carbon fiber diameter of 1 μm/fiber or more and 45 μm or less is first defibrated to remove thread-like carbon fibers 100 mm or more in length. Commercially available carbon fibers include carbon fibers of various shapes such as carbon fiber filaments, carbon fiber tows, and carbon fiber cloth. Any of such carbon fibers may be used. Substantially, 1000 to 300000 of the thread-like carbon fibers are bundled to prepare a carbon fiber bundle 100 mm or more in length. The carbon fiber bundle is then immersed in an adhesive such as a phenolic resin for approximately 1 to 2 minutes. The carbon fiber bundle is removed from the adhesive such as a phenolic resin and air-dried for 24 hours or more.

In the magnesia carbon raw material 12 mixing step (S102), the magnesia carbon raw material 12 is prepared by mixing graphite and the magnesia raw material together such that the graphite content of the magnesia carbon raw material 12 is 1% to 80% by mass, and the magnesia raw material content of the magnesia carbon raw material 12 is 20% to 99% by mass. In the mixing step, predetermined amounts of a curing agent and a binder are added on an outer percentage basis.

In the mixing step, in addition to the graphite, short carbon fibers with a fiber diameter of 1 to 45 μm, a fiber length of 1 mm or less, and a ratio of fiber length to fiber diameter (fiber length/fiber diameter) of 2 to 1000 may be further mixed with the magnesia carbon raw material 12.

In the magnesia carbon raw material 12 kneading step (S103), the magnesia carbon raw material 12 is kneaded in a kneader. In the filling step (S104), 5% or more by volume of the mold of the refractory is filled with the kneaded magnesia carbon raw material 12, and the carbon fiber bundles 14 are then placed at intervals of 3 mm or more. Subsequently, 5% or more by volume of the mold is filled with the kneaded magnesia carbon raw material 12, and the carbon fiber bundles 14 are then placed at intervals of 3 mm or more. Filling with the magnesia carbon raw material 12 and placing the carbon fiber bundles 14 are repeatedly performed to fill the mold with the magnesia carbon raw material 12 and the carbon fiber bundles 14.

Thus, placing the carbon fiber bundles 14 side by side at intervals of 3 mm or more and repeatedly performing filling with the magnesia carbon raw material 12 and placing the carbon fiber bundles to distribute carbon fibers in the transverse direction and in the height method can increase the contact area between the magnesia carbon raw material 12 and the carbon fiber bundles and thereby increase the bending strength and fracture energy of the magnesia carbon refractory. By contrast, when carbon fiber bundles are placed to not be distributed in the transverse and height directions, the contact area between the magnesia carbon raw material 12 and the carbon fiber bundles cannot be increased, and therefore the bending strength and fracture energy of the magnesia carbon refractory 10 cannot be increased. The carbon fiber bundles 14 are preferably placed at intervals of 100 mm or less. When the carbon fiber bundles 14 are placed at intervals of more than 100 mm, number of the carbon fiber bundles 14 placed is so small that the effects of increasing the bending strength and fracture energy are reduced.

After the magnesia carbon raw material 12 is kneaded in the kneading step, the carbon fiber bundles 14 are preferably placed on the kneaded magnesia carbon raw material 12 in the filling step. If the kneading step is performed after the carbon fiber bundles 14 are placed, the carbon fiber bundles 14 are cut by impeller blades of the kneader, and the effects of increasing the bending strength and fracture energy of the magnesia carbon refractory are undesirably reduced.

In the pressing step (S105), the refractory is pressed in the direction perpendicular to the pressing surface 16 to transfer the internal shape of the mold to the magnesia carbon raw material 12 charged in the mold of the refractory, thereby pressing the pressed product. The mold may be a metal, wood, synthetic resin, or rubber mold. The pressed product is dried at 230° C. for 18 hours in the drying step (S106) to complete the magnesia carbon refractory 10 within which the carbon fiber bundles 14 are placed.

Although the magnesia raw material is used as a refractory raw material in this example, instead of the magnesia raw material, an alumina raw material and a silicon carbide raw material may be used, or an alumina raw material, a silicon carbide raw material, and a silica raw material may be used. When an alumina raw material and a silicon carbide raw material are used, the alumina raw material constitutes 10% to 95% by mass of the graphite-containing refractory raw material, and the silicon carbide raw material constitutes 1% or more by mass of the graphite-containing refractory raw material. When an alumina raw material, a silicon carbide raw material, and silica raw material are used, the alumina raw material constitutes 10% to 95% by mass of the graphite-containing refractory raw material, the silicon carbide raw material constitutes 1% or more by mass of the graphite-containing refractory raw material, and the silica raw material constitutes 1% to 50% by mass of the graphite-containing refractory raw material.

The alumina raw material constituting 10% to 95% by mass can improve erosion resistance to molten iron preliminary treatment slag and prevent cracking caused by thermal spalling. By contrast, the alumina raw material constituting less than 10% by mass undesirably results in lower erosion resistance to molten iron preliminary treatment slag. The alumina raw material constituting more than 95% by mass cannot prevent cracking caused by thermal spalling and undesirably results in decreased crack resistance.

The silicon carbide raw material constituting 1% or more by mass can prevent oxidation of graphite in the air and maintain high crack resistance of the graphite-containing refractory. By contrast, the silicon carbide raw material constituting less than 1% by mass cannot prevent oxidation of graphite in the air and undesirably results in decreased crack resistance of the graphite-containing refractory.

The silica raw material constituting 1% to 50% by mass can impart both high crack resistance and high erosion resistance to the graphite-containing refractory. By contrast, the silica raw material constituting less than 1% by mass cannot increase thermal shock fracture resistance due to small expansion and no formation of microcracks, undesirably resulting in decreased crack resistance. The silica raw material constituting more than 50% by mass undesirably results in significantly decreased erosion resistance.

Thus, an alumina raw material and a silicon carbide raw material, or an alumina raw material, a silicon carbide raw material, and a silica raw material, mixed with graphite can improve the erosion resistance to molten iron preliminary treatment slag of the graphite-containing refractory and increase the bending strength and fracture energy of the graphite-containing refractory. Thus, the refractory can suitably be used as a refractory liner for molten iron preliminary treatment vessels such as torpedoes and hot metal ladles.

Although the magnesia raw material is used as a refractory raw material in this example, instead of the magnesia raw material, an alumina raw material and a zirconia raw material may be used. Placing the carbon fiber bundles in a plate refractory containing an alumina raw material, a zirconia raw material, and graphite can also increase the bending strength and fracture energy of the plate refractory.

Although the magnesia raw material is used as a refractory raw material in this example, instead of the magnesia raw material, a refractory waste produced by crushing a used alumina-silicon carbide-carbon refractory may be used. When a refractory waste is used, the refractory waste constitutes 10% to 90% by mass of the graphite-containing refractory raw material. This can achieve almost the same crack resistance and erosion resistance as a graphite-containing refractory made of an unused virgin raw material alone.

Although refractory waste raw materials composed of refractory wastes have a lower purity than virgin raw materials, a virgin raw material constituting 10% or more by mass of a refractory waste can suppress the significant decrease in erosion resistance caused by an $Al_2O_3$ component in the refractory raw material. By contrast, a refractory waste raw material constituting more than 90% by mass cannot reduce the significant decrease in erosion resistance of an $Al_2O_3$ component in the refractory waste raw material due to an excessively small amount of virgin raw material. A refractory waste raw material constituting less than 10% by mass results in a significant increase in treatment cost of refractory waste as industrial waste due to an excessively low reuse rate of the refractory waste.

Figure 7A:
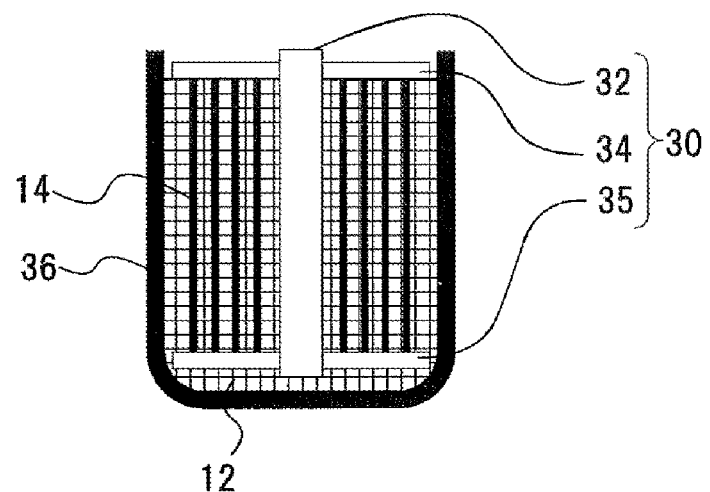
FIGS. 7(a) and 7(b) include explanatory views of a CIP pressing method.
Figure 7B:
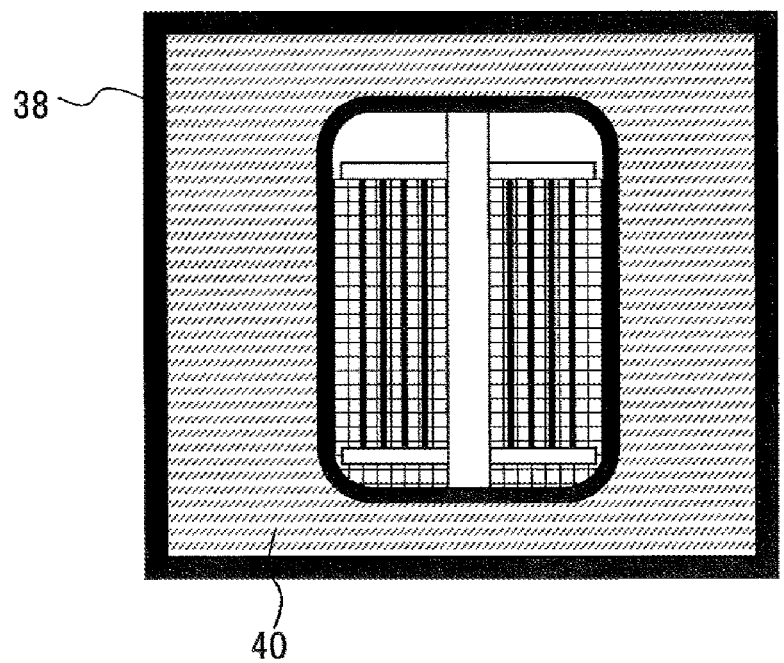

Although the mold is filled with the graphite-containing refractory raw material and the carbon fiber bundles 14 to form a pressed product, our methods and refractories are not limited to this example. For example, a pressed product may be formed by CIP pressing using a pressing vessel illustrated in FIGS. 7(*a*) and 7(*b*). FIGS. 7(*a*) and 7(*b*) include explanatory views of a pressing method by CIP pressing. FIG. 7(*a*) illustrates a pressing vessel 36 filled with the magnesia carbon raw material 12 and the carbon fiber bundles 14, and FIG. 7(*b*) illustrates the pressing vessel 36 in a CIP apparatus 38 filled with a pressure medium 40.

First, a method of filling the pressing vessel 36 with the magnesia carbon raw material 12 and the carbon fiber bundles 14 is described below. In a supporting member 30 including a core metal 32, an upper supporting plate 34, and a lower supporting plate 35, the carbon fiber bundles 14 extend parallel to the core metal 32 between the upper supporting plate 34 and the lower supporting plate 35. The supporting member 30 in which the carbon fiber bundles 14 extend is placed in the pressing vessel 36 made of rubber. The space formed by the supporting member 30 and the pressing vessel 36 is filled with the magnesia carbon raw material 12, and the opening of the pressing vessel 36 is closed to hermetically seal the pressing vessel 36. The hermetically sealed pressing vessel 36 is placed in the CIP apparatus 38 filled with the pressure medium 40 such as water or oil, and a pressure of 49 to 490 MPa is applied to the pressure medium 40. This enables a uniform pressure to be applied to the pressing vessel 36 via the pressure medium 40, thereby pressing a pressed product. CIP pressing is preferably used to form a large tuyere refractory. The length of the core metal 32, the diameter of the core metal 32, the sizes of the upper supporting plate 34 and the lower supporting plate 35, and the size of the pressing vessel 36 can be appropriately determined according to the desired size such as tuyere diameter, of the tuyere refractory. For CIP pressing, the pressing vessel 36 is preferably made of a rubber material.

EXAMPLES

Examples are described below. A graphite-containing refractory containing, as an aggregate, a magnesia carbon raw material for use in a converter was examined by the following method. First, to study the magnesia raw material and graphite contents, the magnesia raw material content and the graphite content were changed as listed in Table 1, and a graphite-containing refractory was produced according to the flow diagram of FIG. 6. The erosion resistance and the crack resistance were evaluated.

TABLE 2

| Slag composition (mass %) | | |
|---|---|---|
| CaO | SiO$_2$ | FeO |
| 30 | 40 | 30 |

For crack resistance, the dynamic elastic modulus $E_0$ in the longitudinal direction of a 40×40×200 mm specimen was determined by an ultrasonic pulse method specified in Japanese Industrial Standards (JIS) R 1605. A spalling test consisting of a cycle of heating at 1500° C. for 10 minutes, water cooling for 5 minutes, and air-cooling for 10 minutes was performed three times. Subsequently, the dynamic elastic modulus $E_3$ was measured again. The ratio of change in dynamic elastic modulus $E_3/E_0$ resulting from the test was determined to evaluate crack resistance. A smaller ratio of change in dynamic elastic modulus $E_3/E_0$ means lower crack resistance.

Table 1 shows that the mixture examples 1-2 to 1-8 with a graphite content of 1% to 80% by mass and a magnesia raw

TABLE 1

| | Particle size (mm) | Unit | Mixture example 1-1 | Mixture example 1-2 | Mixture example 1-3 | Mixture example 1-4 | Mixture example 1-5 | Mixture example 1-6 | Mixture example 1-7 | Mixture example 1-8 | Mixture example 1-9 |
|---|---|---|---|---|---|---|---|---|---|---|---|
| MgO | 3-5 | mass % | 11.7 | 11.6 | 11.2 | 10.0 | 9.4 | 7.1 | 4.7 | 2.4 | 1.2 |
| | 1 or more and less than 3 | | 35.1 | 34.9 | 33.5 | 30.0 | 28.2 | 21.2 | 14.1 | 7.1 | 3.5 |
| | 0.3 or more and less than 1 | | 35.1 | 34.9 | 33.5 | 30.0 | 28.2 | 21.2 | 14.1 | 7.1 | 3.5 |
| | 50-200 Mesh (0.075 or more and less than 0.3) | | 17.6 | 17.5 | 16.8 | 15.0 | 14.1 | 10.6 | 7.1 | 3.5 | 1.8 |
| Flake graphite | — | | | 0.5 | 1.0 | 5.0 | 15.0 | 20.0 | 40.0 | 60.0 | 80.0 | 90.0 |
| Metallic Si powder | — | mass % (outer percentage) | 2.3 | 2.3 | 2.3 | 2.3 | 2.3 | 2.3 | 2.3 | 2.3 | 2.3 |
| Hexamine | — | | 0.3 | 0.3 | 0.3 | 0.3 | 0.3 | 0.3 | 0.3 | 0.3 | 0.3 |
| Phenolic resin | — | | 3 | 3 | 3 | 3 | 3 | 3 | 3 | 3 | 3 |
| Total | | | 100.0 | 100.0 | 100.0 | 100.0 | 100.0 | 100.0 | 100.0 | 100.0 | 100.0 |
| Erosion resistance | | — | | 97 | 98 | 99 | 100 | 103 | 105 | 107 | 109 | 140 |
| Crack resistance | | $E_3/E_0$ | 0.10 | 0.40 | 0.41 | 0.41 | 0.42 | 0.43 | 0.44 | 0.45 | 0.45 |

Figure 8A:
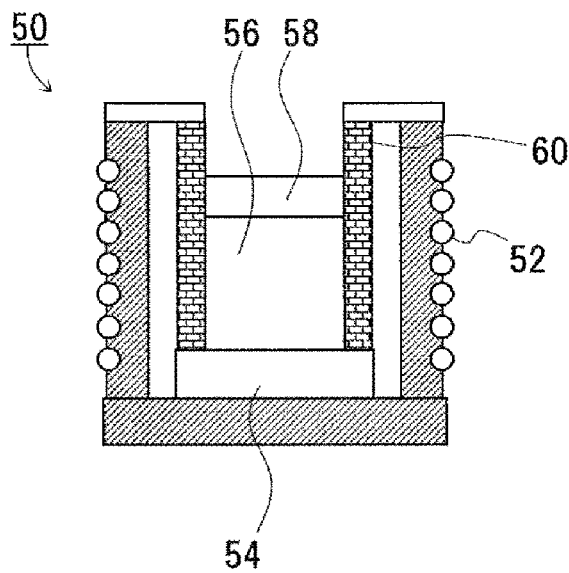
FIGS. 8(a) and 8(b) include schematic cross-sectional views of an erosion test in a high-frequency induction furnace.
Figure 8B:
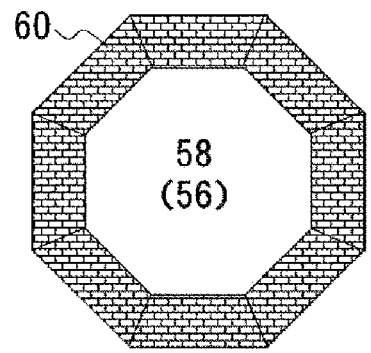

Erosion resistance was determined by a lining partitioning method in a high-frequency induction furnace illustrated in FIGS. 8(*a*) and 8(*b*).

FIGS. 8(*a*) and 8(*b*) include schematic cross-sectional views illustrating an erosion test in a high-frequency induction furnace 50. As illustrated in FIGS. 8(*a*) and 8(*b*), graphite-containing refractories 60 were cylindrically placed on a bottom plate 54 of the high-frequency induction furnace 50 equipped with an induction coil 52. The test temperature was 1500° C., and the temperature holding time was 4 hours. Molten iron 56 or synthetic slag 58 with a composition listed in Table 2 was poured into the high-frequency induction furnace 50 every hour. After cooling, the amount of erosion was measured. The erosion resistance in Table 1 was indicated by the erosion index in which the amount of erosion of a mixture example 1-3 was set at 100. Thus, an erosion index of less than 100 means that the amount of erosion is smaller than that of the mixture example 1-3, and an erosion index of more than 100 means that the amount of erosion is larger than that of the mixture example 1-3.

material content of 20% to 99% by mass had constant erosion resistance and crack resistance. By contrast, the mixture example 1-1 with a graphite content of 0.5% by mass had significantly decreased crack resistance, and the mixture example 1-9 with a magnesia raw material content of 10.0% by mass had significantly decreased erosion resistance. These results show that when the magnesia raw material was used as a refractory raw material, a graphite content of 1% to 80% by mass and a magnesia raw material content of 20% to 99% by mass resulted in both high erosion resistance and high crack resistance of the graphite-containing refractory.

The following describes the effects of the length of carbon fiber bundles on the bending strength, breaking strength, erosion resistance, and crack resistance of a graphite-containing refractory. Table 3 shows the production conditions and evaluation results of tested graphite-containing refractories.

TABLE 3

| | | | Unit | Comparative example 2-1 | Example 2-1 | Example 2-2 | Example 2-3 | Example 2-4 | Example 2-5 | Example 2-6 | Example 2-7 |
|---|---|---|---|---|---|---|---|---|---|---|---|
| Carbon fibers | Fiber shape | Length | mm | 90 | 100 | 100 | 200 | 400 | 600 | 800 | 1000 |
| | | Diameter | μm/fiber | 0.8 | 1 | 1 | | | 7 | | |
| | | Number of bundled fibers | fiber | 990 | 990 | 1,000 | | | 12,000 | | |
| | Preliminary treatment | Phenolic resin bonding | | | | | Done | | | | |
| | Charging method | Initial charging amount of refractory raw material relative to mold volume | Vol % | | | | 10 | | | | |
| | | Second and later charging amounts of refractory raw material relative to mold volume | Vol % | | | | 15 | | | | |
| | | Angle of placement of carbon fiber bundle (θ2) | ° | | | | 90 | | | | |
| | | Intervals between carbon fiber bundles | mm | | | | 5 | | | | |
| | | Repetition of charging of raw material and placement of carbon fiber bundles | | | | | Yes | | | | |
| | Timing of placing carbon fiber bundles | | | | | | After kneading raw materials | | | | |
| Bending strength | | | MPa | 7.0 | 18.4 | 18.5 | 18.6 | 18.7 | 19.0 | 18.8 | 12.5 |
| Fracture energy | | | kJ/m² | 0.8 | 19 | 20 | 21 | 21 | 22 | 23 | 23 |
| Erosion resistance | | | — | 100 | 100 | 100 | 101 | 101 | 101 | 101 | 101 |
| Crack resistance | | | $E_3/E_0$ | 0.35 | 0.49 | 0.50 | 0.51 | 0.51 | 0.53 | 0.52 | 0.51 |

As shown in Table 3, when 990 to 12000 carbon fibers with a fiber diameter of 0.8 to 7 μm/fiber were bundled such that the carbon fiber bundle 14 had a flat end face, the end face of the carbon fiber bundle 14 had a width of 1.0 to 20.0 mm and a thickness of 0.001 to 10.0 mm. TORAYCA (registered trademark) product number CK6261C manufactured by Toray Industries, Inc. was defibrated and used as the carbon fibers. The carbon fiber bundles were cut to 90, 100, 200, 400, 600, 800, or 1000 mm in length. To improve adhesion between carbon fibers and adhesion between the carbon fiber bundles and the magnesia carbon raw material, the carbon fiber bundles were immersed in a phenolic resin for 1 minute to adhere closely to the phenolic resin, and then the carbon fiber bundles and the magnesia carbon raw material were charged by the following method.

A lower part of a mold for a refractory 1000 mm in the longitudinal direction, 300 mm in the transverse direction, and 90 mm in height was filled with a magnesia carbon raw material amounting 10% by volume of the mold. The carbon fiber bundles were placed at intervals of 5 mm such that the angle θ2 between the direction perpendicular to the pressing surface and the direction along the length L1 of the carbon fiber bundle was 90 degrees. The magnesia carbon raw material with which the mold was filled was the magnesia carbon raw material of the mixture example 1-5 listed in Table 1.

Filling with the magnesia carbon raw material and placing the carbon fiber bundles were repeatedly performed to fill the mold with the magnesia carbon raw material and the carbon fiber bundles. After completion of filling, pressing and drying were performed according to the flow diagram of FIG. 6 to prepare graphite-containing refractories according to Examples 2-1 to 2-7 and Comparative Example 2-1. The bending strength, fracture energy, erosion resistance, and crack resistance of the graphite-containing refractories were determined.

The bending strength of the graphite-containing refractory was determined by the three-point bending test method according to Japanese Industrial Standards (JIS) R 2213. The test specimen size was 40×40×140 mm, the center-to-center distance was 100 mm, and the loading speed was 0.5 mm/min.

Figure 9:
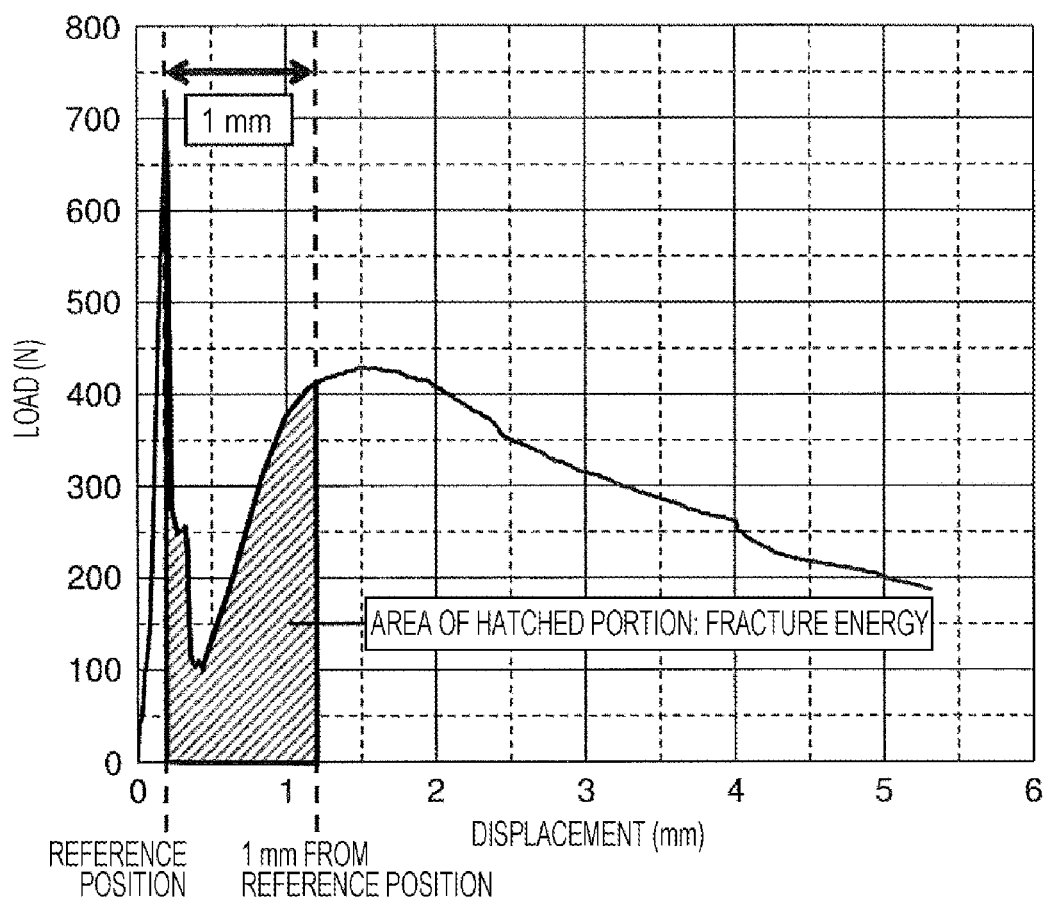
FIG. 9 is a load-displacement curve obtained by a three-point bending test method.

FIG. 9 is a load-displacement curve obtained by the three-point bending test method. The fracture energy can be calculated from the load-displacement curve obtained by the three-point bending test method. The displacement of the first peak value on the load-displacement curve was taken as the reference position, and the area between the reference position and the displacement of 1 mm from the reference position was calculated as fracture energy.

As shown in Table 3, the graphite-containing refractories according to Examples 2-1 to 2-7 containing the carbon fiber bundles 100 mm or more in length had very high bending strength and fracture energy. By contrast, the graphite-containing refractory according to Comparative Example 2-1 containing carbon fiber bundles less than 100 mm in length had lower bending strength and fracture energy than the graphite-containing refractories according to Examples 2-1 to 2-7. This is probably because the graphite-containing refractory according to Comparative Example 2-1 contained short carbon fiber bundles and therefore had no suppressive effect of the carbon fiber bundles on the development of a crack in the refractory. These results show that the length of carbon fibers is 100 mm or more to increase the bending strength and fracture energy of the graphite-containing refractory.

The following describes the effects of the carbon fiber diameter and the number of carbon fiber bundles on the bending strength, breaking strength, erosion resistance, and crack resistance of a graphite-containing refractory. Table 4 shows the production conditions and evaluation results of tested graphite-containing refractories.

refractories according to Examples 3-1 to 3-5 and Comparative Examples 3-1 and 3-2 were determined.

As shown in Table 4, the graphite-containing refractories according to Examples 3-1 to 3-5 and Example 2-5 containing carbon fiber bundles each composed of 1000 to 300000 carbon fibers with a fiber diameter of 1 to 45 μm/fiber had high bending strength and fracture energy. By contrast, the graphite-containing refractory according to Comparative Example 3-1 containing carbon fiber bundles each composed of less than 1000 carbon fibers with a fiber diameter of less than 1 μm/fiber had lower bending strength and fracture energy than the graphite-containing refractories according to Example 2-5 and Examples 3-1 to 3-5. The graphite-containing refractory according to Comparative Example 3-2 containing carbon fiber bundles each composed of more than 300000, more specifically 400000, carbon fibers with a fiber diameter of more than 45 μm/fiber, more specifically 50 μm/fiber, underwent lamination during pressing and was difficult to be pressed due to carbon fiber bundles protruding from a side surface of the refractory. This

TABLE 4

| | | | Unit | Comparative example 3-1 | Example 3-1 | Example 3-2 | Example 2-5 | Example 3-3 | Example 3-4 | Example 3-5 | Comparative example 3-2 |
|---|---|---|---|---|---|---|---|---|---|---|---|
| Carbon fibers | Fiber shape | Length | mm | | | | 600 | | | | 90 |
| | | Diameter | μm/fiber | 1 | 1 | 1 | 7 | 23 | 45 | 45 | 50 |
| | | Number of bundled fibers | fiber | 900 | 1,000 | 10,000 | 12,000 | 30,000 | 60,000 | 300,000 | 400,000 |
| | Preliminary treatment | Phenolic resin bonding | | | | | Done | | | | |
| | Charging method | Initial charging amount of refractory raw material relative to mold volume | Vol % | | | | 10 | | | | |
| | | Second and later charging amounts of refractory raw material relative to mold volume | Vol % | | | | 15 | | | | |
| | | Angle of placement of carbon fiber bundle (θ2) | ° | | | | 90 | | | | |
| | | Intervals between carbon fiber bundles | mm | | | | 5 | | | | |
| | | Repetition of charging of raw material and placement of carbon fiber bundles | | | | | Yes | | | | |
| | Timing of placing carbon fiber bundles | | | | | | After kneading raw materials | | | | |
| Bending strength | | | MPa | 11.5 | 17.9 | 18.5 | 19.0 | 18.8 | 18.7 | 19.0 | Difficult to form |
| Fracture energy | | | kJ/m$^2$ | 10 | 20 | 21 | 22 | 22 | 22 | 22 | |
| Erosion resistance | | | — | 102 | 102 | 101 | 101 | 101 | 101 | 101 | |
| Crack resistance | | | $E_3/E_0$ | 0.45 | 0.52 | 0.51 | 0.53 | 0.52 | 0.51 | 0.54 | |

As shown in Table 4, the graphite-containing refractories according to Examples 3-1 to 3-5 and Comparative Examples 3-1 and 3-2 are graphite-containing refractories in which carbon fiber bundles each composed of 900, 1000, 10000, 12000, 30000, 60000, 300000, or 400000 carbon fibers with a length of 600 mm and a fiber diameter of 1, 7, 23, 45, or 50 μm/fiber are placed. The raw material components of these graphite-containing refractories are the same as those in the mixture example 1-5, and the size of each graphite-containing refractory is the same as that in Example 2-1. The bending strength, fracture energy, erosion resistance, and crack resistance of the graphite-containing is probably because the carbon fiber bundles were too thick to be entangled with the magnesia carbon raw material and caused spring back during pressing. These results show that carbon fiber bundles each composed of 1000 to 300000 carbon fibers with a fiber diameter of 1 to 45 μm/fiber can be used to increase the bending strength and fracture energy of the graphite-containing refractory.

The following describes the effects of the presence or absence of adhesion in carbon fiber bundles on the bending strength, breaking strength, erosion resistance, and crack resistance of a graphite-containing refractory. Table 5 shows the production conditions and evaluation results of tested graphite-containing refractories.

TABLE 5

| | | | Unit | Example 2-5 | Example 4-1 | Example 4-2 | Example 4-3 | Example 4-4 | Example 4-5 | Example 4-6 |
|---|---|---|---|---|---|---|---|---|---|---|
| Carbon fibers | Fiber shape | Length | mm | | | | 600 | | | |
| | | Diameter | μm/fiber | | | | 7 | | | |
| | | Number of bundled fibers | fiber | | | | 12,000 | | | |
| | Preliminary treatment (bonding) | Phenolic resin | | ○ | — | — | — | — | — | ○ |
| | | Alumina sol | | — | ○ | — | — | — | — | ○ |
| | | Silica sol | | — | — | ○ | — | — | — | — |
| | | Pitch | | — | — | — | ○ | — | — | — |
| | | Tar | | — | — | — | — | ○ | — | — |
| | | Starch paste | | — | — | — | — | — | ○ | — |
| | Charging method | Initial charging amount of refractory raw material relative to mold volume | Vol % | | | | 10 | | | |
| | | Second and later charging amounts of refractory raw material relative to mold volume | Vol % | | | | 15 | | | |
| | | Angle of placement of carbon fiber bundle (θ2) | ° | | | | 90 | | | |
| | | Intervals between carbon fiber bundles | mm | | | | 5 | | | |
| | | Repetition of charging of raw material and placement of carbon fiber bundles | | | | | Yes | | | |
| | | Timing of placing carbon fiber bundles | | | | | After kneading raw materials | | | |
| Bending strength | | | MPa | 19.0 | 19.1 | 18.9 | 18.6 | 18.4 | 18.5 | 19.4 |
| Fracture energy | | | kJ/m$^2$ | 22 | 22 | 21 | 20 | 20 | 20 | 24 |
| Erosion resistance | | | — | 101 | 101 | 101 | 101 | 101 | 101 | 101 |
| Crack resistance | | | $E_3/E_0$ | 0.53 | 0.52 | 0.54 | 0.51 | 0.50 | 0.51 | 0.56 |

| | | | Unit | Example 4-7 | Example 4-8 | Example 4-9 | Example 4-10 | Example 4-11 |
|---|---|---|---|---|---|---|---|---|
| Carbon fibers | Fiber shape | Length | mm | | | 600 | | |
| | | Diameter | μm/fiber | | | 7 | | |
| | | Number of bundled fibers | fiber | | | 12,000 | | |
| | Preliminary treatment (bonding) | Phenolic resin | | ○ | ○ | ○ | ○ | — |
| | | Alumina sol | | — | — | — | — | — |
| | | Silica sol | | ○ | — | — | — | — |
| | | Pitch | | — | ○ | — | — | — |
| | | Tar | | — | — | ○ | — | — |
| | | Starch paste | | — | — | — | ○ | — |
| | Charging method | Initial charging amount of refractory raw material relative to mold volume | Vol % | | | 10 | | |
| | | Second and later charging amounts of refractory raw material relative to mold volume | Vol % | | | 15 | | |
| | | Angle of placement of carbon fiber bundle (θ2) | ° | | | 90 | | |
| | | Intervals between carbon fiber bundles | mm | | | 5 | | |
| | | Repetition of charging of raw material and placement of carbon fiber bundles | | | | Yes | | |
| | | Timing of placing carbon fiber bundles | | | | After kneading raw materials | | |

TABLE 5-continued

| | | | | | |
|---|---|---|---|---|---|
| Bending strength | MPa | 19.4 | 19.3 | 19.3 | 19.3 | 12.4 |
| Fracture energy | kJ/m² | 24 | 23 | 23 | 23 | 10 |
| Erosion resistance | — | 101 | 101 | 101 | 101 | 101 |
| Crack resistance | $E_3/E_0$ | 0.56 | 0.55 | 0.55 | 0.55 | 0.45 |

As shown in Table 5, the graphite-containing refractories according to Examples 4-1 to 4-11 are graphite-containing refractories in which carbon fiber bundles each composed of 12000 carbon fibers 600 mm in length and 7 μm/fiber in diameter bonded together by using a phenolic resin, an alumina sol, a silica sol, pitch, tar, or a starch paste as an adhesive or carbon fiber bundles each composed of the carbon fibers not bonded together are placed. The raw material components of these graphite-containing refractories are the same as those in the mixture example 1-5, the size of each graphite-containing refractory is the same as that in Example 2-1, and the production method is the same as the method described in Table 3. The bending strength, fracture energy, erosion resistance, and crack resistance of the graphite-containing refractories according to Examples 4-1 to 4-11 were determined.

As shown in Table 5, the graphite-containing refractories according to Examples 2-5 and 4-1 to 4-5 containing carbon fiber bundles with bonding by a phenolic resin, an alumina sol, a silica sol, pitch, tar, or a starch paste had high bending strength and fracture energy. The graphite-containing refractories according to Examples 4-6 to 4-10 containing carbon fiber bundles with bonding by a phenolic resin and an alumina sol, a phenolic resin and a silica sol, a phenolic resin and pitch, a phenolic resin and tar, or a phenolic resin and a starch paste had high bending strength and fracture energy.

The graphite-containing refractory according to Example 4-11 containing carbon fiber bundles without bonding had lower bending strength and fracture energy than the graphite-containing refractories according to Example 2-5 and Examples 4-1 to 4-10. This is probably because each carbon fiber bundle with bonding improved the adhesion between carbon fibers and the adhesion between the carbon fiber bundles and the magnesia carbon raw material. These results show that carbon fibers are preferably bonded together by using at least one adhesive selected from a phenolic resin, an alumina sol, a silica sol, pitch, tar, and a starch paste to form a carbon fiber bundle to increase the bending strength and fracture energy of the graphite-containing refractory. We believe that the same effect can be achieved by using an epoxy resin, a melamine resin, a urea resin, an alkyd resin, an unsaturated polyester resin, polyurethane, thermosetting polyimide, a zirconia sol, a chromia sol, a titania sol, a magnesia sol, a calcia sol, or an yttria sol, which is similar to the above adhesive.

The following describes the effects of the inclination of carbon fiber bundles on the bending strength, breaking strength, erosion resistance, and crack resistance of a graphite-containing refractory. Table 6 shows the production conditions and evaluation results of tested graphite-containing refractories.

TABLE 6

| | | | Unit | Example 5-1 | Example 2-5 | Example 5-2 | Example 5-3 |
|---|---|---|---|---|---|---|---|
| Carbon fibers | Fiber shape | Length | mm | | 600 | | |
| | | Diameter | μm/fiber | | 7 | | |
| | | Number of bundled fibers | fiber | | 12,000 | | |
| | Preliminary treatment | Phenolic resin bonding | | | Done | | |
| | Charging method | Initial charging amount of refractory raw material relative to mold volume | Vol % | | 10 | | |
| | | Second and later charging amounts of refractory raw material relative to mold volume | Vol % | | 15 | | |
| | | Angle of placement of carbon fiber bundle (θ2) | ° | 45 | 90 | 135 | 0 |
| | | Intervals between carbon fiber bundles | mm | | 5 | | |
| | | Repetition of charging of raw material and placement of carbon fiber bundles | | | Yes | | |
| | Timing of placing carbon fiber bundles | | | After kneading raw materials | | | |
| Bending strength | | | MPa | 18.0 | 19.0 | 18.1 | 12.2 |
| Fracture energy | | | kJ/m² | 20 | 22 | 21 | 11 |
| Erosion resistance | | | — | 101 | 101 | 101 | 101 |
| Crack resistance | | | $E_3/E_0$ | 0.51 | 0.53 | 0.52 | 0.46 |

As shown in Table 6, the graphite-containing refractories according to Examples 5-1 to 5-3 are graphite-containing refractories in which carbon fiber bundles each composed of 12000 carbon fibers 600 mm in length and 7 μm/fiber in diameter are placed at an angle θ2 of 0, 45, 90, or 135 degrees to the transverse direction of the refractories. The raw material components of these graphite-containing refractories are the same as those in the mixture example 1-5, the size of each graphite-containing refractory is the same as that in Example 2-1, and the production method is the same as the method described in Table 3.

A graphite-containing refractory in which carbon fiber bundles are placed at an angle θ2 of 90 degrees to the transverse direction of the refractory corresponds to a graphite-containing refractory illustrated in FIGS. 1(a) and 1(b). A graphite-containing refractory in which carbon fiber bundles are placed at an angle θ2 of 45 degrees corresponds to a graphite-containing refractory illustrated in FIGS. 4(a) and 4(b). A graphite-containing refractory in which carbon fiber bundles are placed at an angle θ2 of 135 degrees corresponds to a graphite-containing refractory illustrated in FIGS. 5(a) and 5(b). The bending strength, fracture energy, erosion resistance, and crack resistance of the graphite-containing refractories according to Examples 5-1 to 5-3 were determined.

As shown in Table 6, the graphite-containing refractory according to Example 2-5 in which carbon fiber bundles were placed at an angle θ2 of 90 degrees to the transverse direction, the graphite-containing refractory according to Example 5-1 in which carbon fiber bundles were placed at an angle θ2 of 45 degrees to the transverse direction, and the graphite-containing refractory according to Example 5-2 in which carbon fiber bundles were placed at an angle θ2 of 135 degrees to the transverse direction had high bending strength and fracture energy. By contrast, the graphite-containing refractory according to Example 5-3 in which carbon fiber bundles were placed at an angle θ2 of 0 degrees to the transverse direction had lower bending strength and fracture energy than the graphite-containing refractories according to Example 2-5 and Examples 5-1 and 5-2. These results show that carbon fiber bundles are preferably placed at an angle θ2 of 45 to 135 degrees to the transverse direction of a graphite-containing refractory to increase the bending strength and fracture energy of the graphite-containing refractory.

The following describes the effects of the intervals of carbon fiber bundles on the bending strength, breaking strength, erosion resistance, and crack resistance of a graphite-containing refractory. Table 7 shows the production conditions and evaluation results of tested graphite-containing refractories.

12000 carbon fibers 600 mm in length and 7 μm/fiber in diameter are placed at intervals of 1, 3, 30, or 100 mm. The raw material components of these graphite-containing refractories are the same as those in the mixture example 1-5, the size of each graphite-containing refractory is the same as that in Example 2-1, and the production method is the same as the method described in Table 3. The bending strength, fracture energy, erosion resistance, and crack resistance of the graphite-containing refractories according to Examples 6-1 to 6-4 were determined.

As shown in Table 7, the graphite-containing refractories according to Examples 6-1 and 6-2 in which carbon fiber bundles were placed at intervals of 3 or 30 mm had slightly higher bending strength and fracture energy than the graphite-containing refractory according to Example 6-3 in which carbon fiber bundles were placed at intervals of 100 mm. The graphite-containing refractory according to Example 6-4 in which carbon fiber bundles were placed at intervals of 1 mm tended to undergo lamination during pressing due to the excessively narrow intervals between the carbon fiber bundles. Thus, the graphite-containing refractory according to Example 6-4 had decreased bending strength and fracture energy as well as decreased erosion resistance and spalling resistance. The bending strength and fracture energy when the intervals between carbon fiber bundles were 100 mm were slightly lower than but almost the same as those when the intervals between carbon fiber bundles were 3 to 30 mm. These results show that the intervals between carbon fiber bundles are preferably 3 to 100 mm, more preferably 3 to 30 mm, to increase the bending strength and fracture energy of the graphite-containing refractory.

The following describes the effects of the intervals of carbon fiber bundles in the pressing direction on the bending strength, breaking strength, erosion resistance, and crack

TABLE 7

| | | | Unit | Example 6-1 | Example 6-2 | Example 6-3 | Example 6-4 |
|---|---|---|---|---|---|---|---|
| Carbon fibers | Fiber shape | Length | mm | | 600 | | |
| | | Diameter | μm/fiber | | 7 | | |
| | | Number of bundled fibers | fiber | | 12,000 | | |
| | Preliminary treatment | Phenolic resin bonding | | | Done | | |
| | Charging method | Initial charging amount of refractory raw material relative to mold volume | Vol % | | 10 | | |
| | | Second and later charging amounts of refractory raw material relative to mold volume | Vol % | | 15 | | |
| | | Angle of placement of carbon fiber bundle (θ2) | ° | | 90 | | |
| | | Intervals between carbon fiber bundles | mm | 3 | 30 | 100 | 1 |
| | | Repetition of charging of raw material and placement of carbon fiber bundles | | | Yes | | |
| | Timing of placing carbon fiber bundles | | | After kneading raw materials | | | |
| Bending strength | | | MPa | 19.5 | 18.1 | 18.0 | 10.8 |
| Fracture energy | | | kJ/m² | 23 | 21 | 20 | 10 |
| Erosion resistance | | | — | 101 | 101 | 101 | 107 |
| Crack resistance | | | $E_3/E_0$ | 0.57 | 0.53 | 0.51 | 0.43 |

As shown in Table 7, the graphite-containing refractories according to Examples 6-1 to 6-4 are graphite-containing refractories in which carbon fiber bundles each composed of resistance of a graphite-containing refractory. Table 8 shows the production conditions and evaluation results of tested graphite-containing refractories.

TABLE 8

|  |  |  | Unit | Example 2-5 | Example 7-1 |
|---|---|---|---|---|---|
| Carbon fibers | Fiber shape | Length | mm | 600 | |
| | | Diameter | μm/fiber | 7 | |
| | | Number of bundled fibers | fiber | 12,000 | |
| | Preliminary treatment | Phenolic resin bonding | | Done | |
| | Charging method | Initial charging amount of refractory raw material relative to mold volume | Vol % | 10 | |
| | | Second and later charging amounts of refractory raw material relative to mold volume | Vol % | 15 | |
| | | Angle of placement of carbon fiber bundle (θ2) | ° | 90 | |
| | | Intervals between carbon fiber bundles | mm | 5 | |
| | | Repetition of charging of raw material and placement of carbon fiber bundles | | Yes | No |
| | | Timing of placing carbon fiber bundles | | After kneading raw materials | |
| | | Bending strength | MPa | 19.0 | 12.9 |
| | | Fracture energy | kJ/m$^2$ | 22 | 12 |
| | | Erosion resistance | — | 101 | 102 |
| | | Crack resistance | $E_3/E_0$ | 0.53 | 0.47 |

As shown in Table 8, the graphite-containing refractory according to Example 7-1 is a graphite-containing refractory in which carbon fiber bundles each composed of 12000 carbon fibers 600 mm in length and 7 μm/fiber in diameter are placed in a single layer instead of filling with the magnesia carbon raw material and placing the carbon fiber bundles being repeatedly performed. The raw material components of this graphite-containing refractory are the same as those in the mixture example 1-5, and the size of the graphite-containing refractory is the same as that in Example 2-1. The bending strength, fracture energy, erosion resistance, and crack resistance of the graphite-containing refractory were determined.

As shown in Table 8, the graphite-containing refractory according to Example 2-5 in which the carbon fiber bundles were layered had high bending strength and fracture energy. By contrast, the graphite-containing refractory according to Example 7-1 in which the carbon fiber bundles were placed in a single layer had lower bending strength and fracture energy. These results show that carbon fiber bundles are preferably layered by repeatedly performing filling with a magnesia carbon raw material and then placing the carbon fiber bundles to increase the bending strength and fracture energy of the graphite-containing refractory.

The following describes the effects of the timing of placing carbon fiber bundles on the bending strength, breaking strength, erosion resistance, and crack resistance of a graphite-containing refractory. Table 9 shows the production conditions and evaluation results of tested graphite-containing refractories.

TABLE 9

|  |  |  | Unit | Example 8-1 | Example 8-2 |
|---|---|---|---|---|---|
| Carbon fibers | Fiber shape | Length | mm | 1,200 | |
| | | Diameter | μm/fiber | 7 | |
| | | Number of bundled fibers | fiber | 24,000 | |
| | Preliminary treatment | Phenolic resin bonding | | Done | |
| | Charging method | Initial charging amount of refractory raw material relative to mold volume | Vol % | 10 | |
| | | Second and later charging amounts of refractory raw material relative to mold volume | Vol % | 15 | |
| | | Angle of placement of carbon fiber bundle (θ2) | ° | 90 | 90 |
| | | Intervals between carbon fiber bundles | mm | 5 | |
| | | Repetition of charging of raw material and placement of carbon fiber bundles | | Yes | |
| | | Timing of placing carbon fiber bundles | | After kneading raw materials | Before kneading raw materials |
| | | Bending strength | MPa | 24.7 | 14.8 |
| | | Fracture energy | kJ/m$^2$ | 48 | 29 |
| | | Erosion resistance | — | 101 | 101 |
| | | Crack resistance | $E_3/E_0$ | 0.70 | 0.50 |

As shown in Table 9, the graphite-containing refractory according to Example 8-1 is a graphite-containing refractory produced by placing carbon fiber bundles each composed of 24000 carbon fibers 1200 mm in length and 7 μm/fiber in diameter on the magnesia carbon raw material after kneading. The graphite-containing refractory according to Example 8-2 is a graphite-containing refractory produced by placing the same carbon fiber bundles on the magnesia carbon raw material before kneading and by subsequently kneading the magnesia carbon raw material. The raw material components of these graphite-containing refractories are the same as those in the mixture example 1-5, and the size of each graphite-containing refractory is the same as that in Example 2-1. The bending strength, fracture energy, erosion resistance, and crack resistance of the graphite-containing refractories according to Examples 8-1 and 8-2 were determined.

As shown in Table 9, the graphite-containing refractory according to Example 8-1 in which the carbon fiber bundles were placed on the magnesia carbon raw material after kneading had high bending strength and fracture energy. By contrast, the graphite-containing refractory according to Example 8-2 in which the carbon fiber bundles were mixed before kneading and were subsequently kneaded had lower bending strength and fracture energy than the graphite-containing refractory according to Example 8-1. This is probably because kneading after placing carbon fiber bundles caused the carbon fiber bundles to be cut by impeller blades during kneading, and the decrease in fiber length resulted in a smaller suppressive effect of the carbon fiber bundles on the development of a crack. These results show that carbon fiber bundles are preferably placed on a refractory raw material after kneading the refractory raw material and before the pressing step to increase the bending strength and fracture energy of the graphite-containing refractory.

The following describes the effects of the angle of carbon fiber bundles to the transverse direction on the bending strength, breaking strength, erosion resistance, and crack resistance of a graphite-containing refractory produced by CIP pressing. Table 10 shows the production conditions and evaluation results of tested graphite-containing refractories.

in diameter being bonded by the same method as the bonding method described in Table 3 were placed between the upper supporting plate 34 and the lower supporting plate 35 in the supporting member 30 such that the angle θ3 between the length direction of each carbon fiber bundle and the transverse direction of each graphite-containing refractory was 45 degrees (FIG. 10(b)), 90 degrees (FIG. 10(a)), 135 degrees (FIG. 10(c)), or 5 degrees and intervals of the bundles were 5 mm. The supporting member 30 in which the carbon fiber bundles 14 were placed was put in the pressing vessel 36. The space formed by the supporting member 30 and the pressing vessel 36 was filled with the magnesia carbon raw material 12. The opening was then closed to hermetically seal the pressing vessel 36.

FIG. 11 is a schematic cross-sectional view of the pressing state in a CIP apparatus. As illustrated in FIG. 11, the hermetically sealed pressing vessel 36 was placed in the CIP apparatus 38 filled with the pressure medium 40 and was pressed via the pressure medium 40. After a pressure was applied for a predetermined time, a pressed product was removed from the pressing vessel 36 to prepare the graphite-containing refractories according to Examples 9-1 to 9-4. The raw material components of these graphite-containing refractories are the same as those in the mixture example 1-5, and the size of each graphite-containing refractory is the same as that in Example 2-1. The bending strength, fracture energy, erosion resistance, and crack resistance of the graphite-containing refractories according to Examples 9-1 to 9-4 were determined.

As shown in Table 10, the graphite-containing refractories according to Examples 9-1 to 9-3 in which the angle θ3 was 45, 90, or 135 degrees to the transverse direction of each graphite-containing refractory had high bending strength and fracture energy against the stress in the transverse direction. By contrast, the graphite-containing refractory according to Example 9-4 in which the angle θ3 was 5

TABLE 10

| | | | Unit | Example 9-1 | Example 9-2 | Example 9-3 | Example 9-4 |
|---|---|---|---|---|---|---|---|
| Carbon fibers | Fiber shape | Length | mm | | 800 | | |
| | | Diameter | μm/fiber | | 7 | | |
| | | Number of bundled fibers | fiber | | 24,000 | | |
| | Preliminary treatment | Phenolic resin bonding | | | Done | | |
| | Charging method | Initial charging amount of refractory raw material relative to mold volume | Vol % | | 10 | | |
| | | Second and later charging amounts of refractory raw material relative to mold volume | Vol % | | 15 | | |
| | | Angle of placement of carbon fiber bundle (θ3) | ° | 45 | 90 | 135 | 5 |
| | | Intervals between carbon fiber bundles | mm | | 5 | | |
| | | Repetition of charging of raw material and placement of carbon fiber bundles | | | Yes | | |
| | Timing of placing carbon fiber bundles | | | After kneading raw materials | | | |
| Bending strength | | | MPa | 23.0 | 23.8 | 23.1 | 16.7 |
| Fracture energy | | | kJ/m$^2$ | 43 | 45 | 44 | 27 |
| Erosion resistance | | | — | 101 | 101 | 101 | 101 |
| Crack resistance | | | $E_3/E_0$ | 0.65 | 0.67 | 0.66 | 0.58 |

FIGS. 10(a)-10(c) include schematic cross-sectional views illustrating the placement angles of carbon fiber bundles in Examples 9-1 to 9-3. As shown in Table 10 and FIGS. 10(a), (b), and (c), carbon fiber bundles each composed of 2400 carbon fibers 800 mm in length and 7 μm/fiber degrees to the transverse direction of the graphite-containing refractory had lower bending strength and fracture energy against the stress in the transverse direction than the graphite-containing refractories according to Examples 9-1 to 9-3. These results also show that in a graphite-containing refractory pressed by CIP pressing, carbon fiber bundles are preferably placed at an angle θ3 of 45 to 135 degrees to the transverse direction of the graphite-containing refractory to increase the bending strength and fracture energy of the graphite-containing refractory.

The following describes the effects of the angle to the longitudinal direction of each carbon fiber bundle on the bending strength, breaking strength, erosion resistance, and crack resistance of the graphite-containing refractories produced by CIP pressing, wherein the direction in which the carbon fiber bundles were placed in the graphite-containing refractories illustrated in FIGS. 10(a)-10(c) was changed to the direction along the longitudinal direction of each graphite-containing refractory. Table 11 shows the production conditions and evaluation results of tested graphite-containing refractories.

Figure 13:
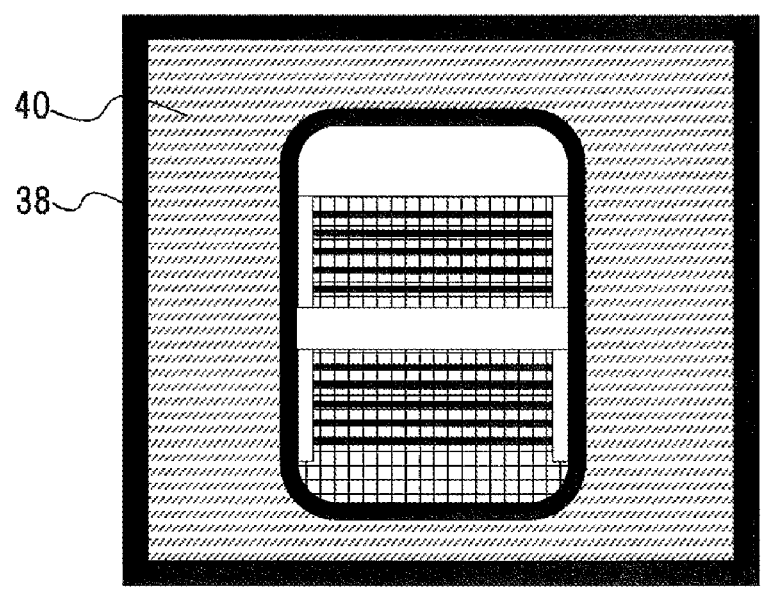
FIG. 13 is a schematic cross-sectional view of the state of pressing by a CIP apparatus.

FIG. 13 is a schematic cross-sectional view of the pressing state in a CIP apparatus. As illustrated in FIG. 13, the hermetically sealed pressing vessel 36 was placed in the CIP apparatus 38 filled with the pressure medium 40 and was pressed via the pressure medium 40. After a pressure was applied for a predetermined time, a pressed product was removed from the pressing vessel 36 to prepare the graphite-containing refractories according to Examples 10-1 to 10-4. The raw material components of these graphite-containing refractories are the same as those in the mixture example 1-5, and the size of each graphite-containing refractory is the same as that in Example 2-1. The bending strength, fracture energy, erosion resistance, and crack resistance of Examples 10-1 to 10-4 were determined.

As shown in Table 11, the graphite-containing refractories according to Examples 10-1 to 10-3 in which the angle θ4

TABLE 11

| | | | Unit | Example 10-1 | Example 10-2 | Example 10-3 | Example 10-4 |
|---|---|---|---|---|---|---|---|
| Carbon fibers | Fiber shape | Length | mm | | 1,200 | | |
| | | Diameter | μm/fiber | | 7 | | |
| | | Number of bundled fibers | fiber | | 24,000 | | |
| | Preliminary treatment | Phenolic resin bonding | | | Done | | |
| | Charging method | Initial charging amount of refractory raw material relative to mold volume | Vol % | | 10 | | |
| | | Second and later charging amounts of refractory raw material relative to mold volume | Vol % | | 15 | | |
| | | Angle of placement of carbon fiber bundle (θ4) | ° | 45 | 90 | 135 | 5 |
| | | Intervals between carbon fiber bundles | mm | | 5 | | |
| | | Repetition of charging of raw material and placement of carbon fiber bundles | | | Yes | | |
| | Timing of placing carbon fiber bundles | | | After kneading raw materials | | | |
| Bending strength | | | MPa | 24.1 | 24.7 | 24.2 | 17.3 |
| Fracture energy | | | kJ/m² | 47 | 48 | 46 | 29 |
| Erosion resistance | | | — | 101 | 101 | 101 | 101 |
| Crack resistance | | | $E_3/E_0$ | 0.68 | 0.70 | 0.69 | 0.61 |

FIGS. 12(a)-12(c) include schematic cross-sectional views illustrating the placement angles of carbon fiber bundles in Examples 10-1 to 10-3. Using a pressing vessel 1500 mm in the longitudinal direction, 150 mm in the transverse direction, and 150 mm in height, as shown in Table 11 and FIGS. 12(a), (b), and (c), carbon fiber bundles each composed of 24000 carbon fibers 1200 mm in length and 7 μm/fiber in diameter bonded by the same method as the bonding method described in Table 3 were placed between the upper supporting plate 34 and the lower supporting plate 35 such that the angle θ4 between the length direction of each carbon fiber bundle and the longitudinal direction of each graphite-containing refractory was 45 degrees (FIG. 12(b)), 90 degrees (FIG. 12(a)), 135 degrees (FIG. 12(c)), or 5 degrees and intervals between the bundles were 5 mm. The supporting member 30 in which the carbon fiber bundles 14 were thus placed was turned 90 degrees and was put in the pressing vessel 36. The space formed by the supporting member 30 and the pressing vessel 36 was filled with the magnesia carbon raw material 12. The opening was then closed to hermetically seal the pressing vessel 36.

was 45, 90, or 135 degrees to the longitudinal direction of each graphite-containing refractory had high bending strength and fracture energy against the stress in the longitudinal direction. By contrast, the graphite-containing refractory according to Example 10-4 in which the angle θ4 was 5 degrees to the longitudinal direction of the graphite-containing refractory had lower bending strength and fracture energy against the stress in the longitudinal direction than the graphite-containing refractories according to Examples 10-1 to 10-3. These results show that the carbon fiber bundles 14 are preferably placed at an angle θ4 of 45 to 135 degrees to the longitudinal direction of a graphite-containing refractory to increase the bending strength and fracture energy of the graphite-containing refractory.

The following describes the effects of the amounts of alumina raw material, silicon carbide raw material, and silica raw material for use in a refractory liner for a molten iron preliminary treatment vessel on the bending strength, breaking strength, erosion resistance, and crack resistance of a graphite-containing refractory. Table 12 shows the production conditions and evaluation results of tested graphite-containing refractories.

TABLE 12

| | | Particle size (mm) | Unit | Example 11-1 | Example 11-2 | Example 11-3 | Example 11-4 | Example 11-5 | Example 11-6 |
|---|---|---|---|---|---|---|---|---|---|
| Refractory raw material | $Al_2O_3$ | 3-5 | mass % | 1.5 | 2.3 | 3.3 | 5.0 | 5.0 | 4.2 |
| | | 1 or more and less than 3 | | 3.0 | 4.7 | 6.7 | 10.0 | 10.0 | 8.3 |
| | | 0.3 or more and less than 1 | | 3.0 | 4.7 | 6.7 | 10.0 | 10.0 | 8.3 |
| | | 50-200 Mesh (0.075 or more and less than 0.3) | | 1.5 | 2.3 | 3.3 | 5.0 | 5.0 | 4.2 |
| | $SiO_2$ | 1 or more and less than 3 | | 0.3 | 0.3 | 0.5 | 5.0 | 25.0 | 27.5 |
| | | 0.3 or more and less than 1 | | 0.3 | 0.3 | 0.5 | 5.0 | 25.0 | 27.5 |
| | SiC | | | 0.5 | 0.5 | 1.0 | 1.0 | 1.0 | 1.0 |
| | Flake graphite | — | | 90.0 | 85.0 | 78.0 | 59.0 | 19.0 | 19.0 |
| | Metallic Si powder | — | | 2.3 | 2.3 | 2.3 | 2.3 | 2.3 | 2.3 |
| | Hexamine | — | | 0.3 | 0.3 | 0.3 | 0.3 | 0.3 | 0.3 |
| | Phenolic resin | — | | 3 | 3 | 3 | 3 | 3 | 3 |
| | Total | | | 105.6 | 105.6 | 105.6 | 105.6 | 105.6 | 105.6 |
| Carbon fibers | Fiber shape | Length | mm | | | 600 | | | |
| | | Diameter | μm/fiber | | | 7 | | | |
| | | Number of bundled fibers | fiber | | | 12000 | | | |
| | Preliminary treatment | Phenolic resin bonding | | | | Done | | | |
| | Charging method | Initial charging amount of refractory raw material relative to mold volume | Vol % | | | 10 | | | |
| | | Second and later charging amounts of refractory raw material relative to mold volume | Vol % | | | 15 | | | |
| | | Angle of placement of carbon fiber bundle (θ2) | ° | | | 90 | | | |
| | | Intervals between carbon fiber bundles | mm | | | 5 | | | |
| | | Repetition of charging of raw material and placement of carbon fiber bundles | | | | Yes | | | |
| | Timing of placing fiber bundles | | | | | After kneading raw materials | | | |
| Bending strength | | | MPa | 10.7 | 14.5 | 18.2 | 18.9 | 19.2 | 19.3 |
| Fracture energy | | | $kJ/m^2$ | 12 | 20 | 22 | 21 | 23 | 24 |
| Erosion resistance | | | — | 120 | 120 | 97 | 101 | 107 | 110 |
| Crack resistance | | | $E_3/E_0$ | 0.46 | 0.50 | 0.55 | 0.53 | 0.63 | 0.64 |

| | | | | Example 11-7 | Example 11-8 | Example 11-9 | Example 11-10 | Example 11-11 |
|---|---|---|---|---|---|---|---|---|
| Refractory raw material | $Al_2O_3$ | 3-5 | mass % | 8.3 | 8.3 | 12.5 | 15.8 | 16.5 |
| | | 1 or more and less than 3 | | 16.7 | 16.7 | 25.0 | 31.7 | 33.0 |
| | | 0.3 or more and less than 1 | | 16.7 | 16.7 | 25.0 | 31.7 | 33.0 |
| | | 50-200 Mesh (0.075 or more and less than 0.3) | | 8.3 | 8.3 | 12.5 | 15.8 | 16.5 |
| | $SiO_2$ | 1 or more and less than 3 | | 5.0 | 15.0 | 2.5 | 1.5 | 0.0 |
| | | 0.3 or more and less than 1 | | 5.0 | 15.0 | 2.5 | 1.5 | 0.0 |

TABLE 12-continued

|  |  |  |  |  |  |  |  |  |
|---|---|---|---|---|---|---|---|---|
|  | SiC |  |  |  | 1.0 | 1.0 | 1.0 | 1.0 | 0.5 |
|  | Flake graphite | — |  |  | 39.0 | 19.0 | 19.0 | 1.0 | 0.5 |
|  | Metallic Si powder | — |  |  | 2.3 | 2.3 | 2.3 | 2.3 | 2.3 |
|  | Hexamine | — |  |  | 0.3 | 0.3 | 0.3 | 0.3 | 0.3 |
|  | Phenolic resin | — |  |  | 3 | 3 | 3 | 3 | 3 |
|  | Total |  |  |  | 105.6 | 105.6 | 105.6 | 105.6 | 105.6 |
| Carbon fibers | Fiber shape | Length | mm |  | 600 |
|  |  | Diameter | μm/fiber |  | 7 |
|  |  | Number of bundled fibers | fiber |  | 12000 |
|  | Preliminary treatment | Phenolic resin bonding |  |  | Done |
|  | Charging method | Initial charging amount of refractory raw material relative to mold volume | Vol % |  | 10 |
|  |  | Second and later charging amounts of refractory raw material relative to mold volume | Vol % |  | 15 |
|  |  | Angle of placement of carbon fiber bundle (θ2) | ° |  | 90 |
|  |  | Intervals between carbon fiber bundles | mm |  | 5 |
|  |  | Repetition of charging of raw material and placement of carbon fiber bundles |  |  | Yes |
|  | Timing of placing fiber bundles |  |  |  | After kneading raw materials |
| Bending strength |  |  | MPa | 18.8 | 19.0 | 18.1 | 18.3 | 11.4 |
| Fracture energy |  |  | kJ/m$^2$ | 21 | 22 | 20 | 20 | 14 |
| Erosion resistance |  |  | — | 100 | 103 | 99 | 98 | 108 |
| Crack resistance |  |  | $E_3/E_0$ | 0.54 | 0.57 | 0.52 | 0.51 | 0.45 |

As shown in Table 12, the graphite-containing refractories according to Examples 11-1 to 11-11 are graphite-containing refractories in which carbon fiber bundles each composed of 12000 carbon fibers 600 mm in length and 7 μm/fiber in diameter are placed, wherein the amounts of alumina raw material, silicon carbide raw material, silica raw material, and graphite in a graphite-containing refractory raw material are changed. The size of each graphite-containing refractory is the same as that in Example 2-1, and the production method is the same as the method described in Table 3. The bending strength, fracture energy, erosion resistance, and crack resistance of the graphite-containing refractories according to Examples 11-1 to 11-11 were determined.

As shown in Table 12, the graphite-containing refractories according to Examples 11-3 to 11-5 and Examples 11-7 to 11-10, in which the alumina raw material constituted 10% to 95% by mass, the silica raw material constituted 1% to 50% by mass, and the silicon carbide raw material constituted 1% or more by mass, had high fracture energy and had both high crack resistance and high erosion resistance. By contrast, the graphite-containing refractory according to Example 11-1, in which the alumina raw material constituted 9.0% by mass and the silica raw material constituted 0.6% by mass, had decreased bending strength and erosion resistance. The graphite-containing refractory according to Example 11-2, in which the silica raw material constituted 0.6% by mass, had decreased erosion resistance. The graphite-containing refractory according to Example 11-6, in which the silica raw material constituted 55.0% by mass, also had decreased erosion resistance. Furthermore, the graphite-containing refractory according to Example 11-11, in which the alumina raw material constituted 99.0% by mass, had decreased bending strength and fracture energy. These results show that when an alumina raw material, a silicon carbide raw material, a silica raw material, and graphite are used in the graphite-containing refractory raw material, the alumina raw material preferably constitutes 10% to 95% by mass, the silicon carbide raw material preferably constitutes 1% or more by mass, and the silica raw material preferably constitutes 1% to 50% by mass to increase the bending strength and fracture energy of the graphite-containing refractory.

The following describes the effects of the amount of refractory waste produced by crushing used alumina-silicon carbide-carbon refractory waste for use in a refractory liner for a molten iron preliminary treatment vessel on the bending strength, breaking strength, erosion resistance, and crack resistance of a graphite-containing refractory. Table 13 shows the production conditions and evaluation results of tested graphite-containing refractories.

TABLE 13

|  |  | Particle size (mm) | Unit | Example 12-1 | Example 12-2 | Example 12-3 | Example 12-4 |
|---|---|---|---|---|---|---|---|
| Refractory raw material | Refractory waste raw material | 3-5 | mass % | 5 | 25 | 45.0 | 47.5 |
|  |  | 1 or more and less than 3 |  | 5 | 25 | 45.0 | 47.5 |
|  | $Al_2O_3$ | 3-5 |  | 18.0 | 9.4 | 2.0 | 0.0 |
|  |  | 1 or more and less than 3 |  | 18.0 | 9.4 | 2.0 | 0.0 |
|  |  | 0.3 or more and less than 1 |  | 6.0 | 3.1 | 0.0 | 0.0 |
|  | $SiO_2$ | 1 or more and less than 3 |  | 20.0 | 10.0 | 1.0 | 0.0 |
|  |  | 0.3 or more and less than 1 |  | 20.0 | 10.0 | 1.0 | 0.0 |
|  | SiC |  |  | 4.5 | 4.5 | 3.0 | 4.5 |
|  | Flake graphite | — |  | 3.5 | 3.5 | 1.0 | 0.5 |
|  | Metallic Si powder | — |  | 2.3 | 2.3 | 2.3 | 2.3 |
|  | Hexamine | — |  | 0.3 | 0.3 | 0.3 | 0.3 |
|  | Phenolic resin | — |  | 3 | 3 | 3 | 3 |
|  | Total |  |  | 105.6 | 105.6 | 105.6 | 10.6 |
| Carbon fibers | Fiber shape | Length | mm |  | 600 |  | 90 |
|  |  | Diameter | μm/fiber |  | 7 |  | 0.8 |
|  |  | Number of bundled fibers | fiber |  | 12,000 |  | 990 |
|  | Preliminary treatment | Phenolic resin bonding |  |  | Done |  |  |
|  | Charging method | Initial charging amount of refractory raw material relative to mold volume | Vol % |  | 10 |  |  |
|  |  | Second and later charging amounts of refractory raw material relative to mold volume | Vol % |  | 15 |  |  |
|  |  | Angle of placement of carbon fiber bundle (θ2) | ° |  | 90 |  |  |
|  |  | Intervals between carbon fiber bundles | mm |  | 5 |  |  |
|  |  | Repetition of charging of raw material and placement of carbon fiber bundles |  |  | Yes |  |  |
|  | Timing of placing fiber bundles |  |  |  | After kneading raw materials |  |  |
| Bending strength |  |  | MPa | 18.0 | 17.6 | 17.2 | 6.7 |
| Fracture energy |  |  | $kJ/m^2$ | 22 | 21 | 20 | 0.7 |
| Erosion resistance |  |  | — | 108 | 114 | 120 | 139 |
| Crack resistance |  |  | $E_3/E_0$ | 0.62 | 0.58 | 0.54 | 0.39 |

As shown in Table 13, the graphite-containing refractories according to Examples 12-1 to 12-4 are graphite-containing refractories in which carbon fiber bundles each composed of 12000 carbon fibers 600 mm in length and 7 μm/fiber in diameter are placed, wherein the amounts of refractory waste, alumina raw material, silicon carbide raw material, silica raw material, and graphite in a graphite-containing refractory raw material are changed. The size of each graphite-containing refractory is the same as that in Example 2-1, and the production method is the same as the method described in Table 3. The bending strength, fracture energy, erosion resistance, and crack resistance of the graphite-containing refractories according to Examples 12-1 to 12-4 were determined.

Table 13 shows that the graphite-containing refractories according to Examples 12-1 to 12-3, in which the refractory waste constituted 10% to 90% by mass, had almost the same crack resistance and erosion resistance as graphite-containing refractories produced from virgin raw materials alone. By contrast, the graphite-containing refractory according to Example 12-4, in which the refractory waste constituted 95.0% by mass, had decreased erosion resistance. These results show that when refractory waste produced by crushing used alumina-silicon carbide-carbon refractory waste is used in the graphite-containing refractory raw material, the refractory waste preferably constitutes 10% to 90% by mass to increase the bending strength and fracture energy of the graphite-containing refractory.

The following describes the effects of the amounts of alumina raw material and silicon carbide raw material in an alumina carbon graphite-containing refractory on the bending strength, breaking strength, erosion resistance, and crack resistance of a graphite-containing refractory. Table 14 shows the production conditions and evaluation results of tested graphite-containing refractories.

TABLE 14

|  |  | Particle size (mm) | Unit | Example 13-1 | Example 13-2 | Example 13-3 | Example 13-4 | Example 13-5 | Example 13-6 |
|---|---|---|---|---|---|---|---|---|---|
| Refractory raw material | $Al_2O_3$ | 3-5 | mass % | 1.0 | 3.2 | 6.7 | 10.0 | 13.3 | 16.3 |
|  |  | 1 or more and less than 3 |  | 2.0 | 6.3 | 13.3 | 20.0 | 26.7 | 32.7 |
|  |  | 0.3 or more and less than 1 |  | 2.0 | 6.3 | 13.3 | 20.0 | 26.7 | 32.7 |
|  |  | 50-200 Mesh (0.075 or more and less than 0.3) |  | 1.0 | 3.2 | 6.7 | 10.0 | 13.3 | 16.3 |
|  | SiC |  |  | 1.0 | 1.0 | 1.0 | 1.0 | 1.0 | 1.0 |
|  | Flake graphite | — |  | 93.0 | 80.0 | 59.0 | 39.0 | 19.0 | 1.0 |
|  | Metallic Si powder | — |  | 2.3 | 2.3 | 2.3 | 2.3 | 2.3 | 2.3 |

TABLE 14-continued

|  |  | Particle size (mm) | Unit | Example 13-1 | Example 13-2 | Example 13-3 | Example 13-4 | Example 13-5 | Example 13-6 |
|---|---|---|---|---|---|---|---|---|---|
|  | Hexamine | — |  | 0.3 | 0.3 | 0.3 | 0.3 | 0.3 | 0.3 |
|  | Phenolic resin | — |  | 3 | 3 | 3 | 3 | 3 | 3 |
|  | Total |  |  | 105.6 | 105.6 | 105.6 | 105.6 | 105.6 | 105.6 |
| Carbon fibers | Fiber shape | Length | mm | | | | 600 | | |
|  |  | Diameter | μm/fiber | | | | 7 | | |
|  |  | Number of bundled fibers | fiber | | | | 12000 | | |
|  | Preliminary treatment | Phenolic resin bonding |  | | | | Done | | |
|  | Charging method | Initial charging amount of refractory raw material relative to mold volume | Vol % | | | | 10 | | |
|  |  | Second and later charging amounts of refractory raw material relative to mold volume | Vol % | | | | 15 | | |
|  |  | Angle of placement of carbon fiber bundle (θ2) | ° | | | | 90 | | |
|  |  | Intervals between carbon fiber bundles | mm | | | | 5 | | |
|  |  | Repetition of charging of raw material and placement of carbon fiber bundles |  | | | | Yes | | |
|  | Timing of placing fiber bundles |  |  | | | After kneading raw materials | | | |
| Bending strength |  |  | MPa | 10.7 | 14.0 | 17.9 | 18.0 | 18.0 | 11.0 |
| Fracture energy |  |  | kJ/m² | 12 | 20 | 21 | 22 | 22 | 13 |
| Erosion resistance |  |  | — | 120 | 114 | 101 | 100 | 102 | 101 |
| Crack resistance |  |  | $E_3/E_0$ | 0.46 | 0.50 | 0.53 | 0.54 | 0.52 | 0.45 |

As shown in Table 14, the graphite-containing refractories according to Examples 13-1 to 13-6 are graphite-containing refractories in which carbon fiber bundles each composed of 12000 carbon fibers 600 mm in length and 7 μm/fiber in diameter are placed, wherein the amounts of alumina raw material, silicon carbide raw material, and graphite in a graphite-containing refractory raw material are changed. The size of each graphite-containing refractory is the same as that in Example 2-1, and the production method is the same as the method described in Table 3. The bending strength, fracture energy, erosion resistance, and crack resistance of the graphite-containing refractories according to Examples 13-1 to 13-6 were determined.

Table 14 shows that the graphite-containing refractories according to Examples 13-2 to 13-5, in which the alumina raw material constituted 10% to 95% by mass, maintained high bending strength and fracture energy and had both high crack resistance and high erosion resistance. By contrast, the graphite-containing refractory according to Example 13-1, in which the alumina raw material constituted 6.0% by mass, had decreased bending strength and fracture energy. The graphite-containing refractory according to Example 13-6, in which the alumina raw material constituted 98% by mass, could not prevent cracking caused by thermal spalling and had decreased crack resistance and erosion resistance. These results show that when an alumina-carbon system graphite-containing refractory is used, the alumina raw material preferably constitutes 10% to 95% by mass, and the silicon carbide raw material preferably constitutes 1% or more by mass to increase the bending strength and fracture energy of the graphite-containing refractory.

The following describes the effects of the amounts of silica raw material and silicon carbide raw material in a silicacarbon system graphite-containing refractory on the bending strength, breaking strength, erosion resistance, and crack resistance of a graphite-containing refractory. Table 15 shows the production conditions and evaluation results of tested graphite-containing refractories.

TABLE 15

|  |  | Particle size (mm) | Unit | Comparative example 14-1 | Example 14-1 | Example 14-2 | Example 14-3 | Example 14-4 |
|---|---|---|---|---|---|---|---|---|
| Refractory raw material | SiO₂ | 1 or more and less than 3 | mass % | 0.0 | 9.5 | 17.0 | 25.0 | 49.0 |
|  |  | 0.3 or more and less than 1 |  | 0.0 | 9.5 | 17.0 | 25.0 | 49.0 |
|  | SiC |  |  | 1.0 | 1.0 | 1.0 | 1.0 | 1.0 |
|  | Flake graphite | — |  | 99.0 | 80.0 | 65.0 | 49.0 | 1.0 |
|  | Metallic Si powder | — |  | 2.3 | 2.3 | 2.3 | 2.3 | 2.3 |
|  | Hexamine | — |  | 0.3 | 0.3 | 0.3 | 0.3 | 0.3 |
|  | Phenolic resin | — |  | 3 | 3 | 3 | 3 | 3 |
|  | Total |  |  | 105.6 | 105.6 | 105.6 | 105.6 | 105.6 |
| Carbon fibers | Fiber shape | Length | mm | | | 600 | | |
|  |  | Diameter | μm/fiber | | | 7 | | |
|  |  | Number of bundled fibers | fiber | | | 12000 | | |
|  | Preliminary treatment | Phenolic resin bonding |  | | | Done | | |
|  | Charging method | Initial charging amount of refractory raw material relative to mold volume | Vol % | | | 10 | | |

TABLE 15-continued

|  | Particle size (mm) | Unit | Comparative example 14-1 | Example 14-1 | Example 14-2 | Example 14-3 | Example 14-4 |
|---|---|---|---|---|---|---|---|
|  | Second and later charging amounts of refractory raw material relative to mold volume | Vol % |  |  | 15 |  |  |
|  | Angle of placement of carbon fiber bundle (θ2) | ° |  |  | 90 |  |  |
|  | Intervals between carbon fiber bundles | mm |  |  | 5 |  |  |
|  | Repetition of charging of raw material and placement of carbon fiber bundles |  |  |  | Yes |  |  |
| Timing of placing fiber bundles |  |  |  | After kneading raw materials |  |  |  |
| Bending strength |  | MPa | 6.6 | 17.7 | 18.0 | 17.8 | 11.1 |
| Fracture energy |  | kJ/m² | 1 | 21 | 22 | 22 | 13 |
| Erosion resistance |  | — | 140 | 101 | 100 | 102 | 119 |
| Crack resistance |  | $E_3/E_0$ | 0.40 | 0.50 | 0.51 | 0.50 | 0.45 |

As shown in Table 15, the graphite-containing refractories according to Examples 14-1 to 14-4 and Comparative Example 14-1 are graphite-containing refractories in which carbon fiber bundles each composed of 12000 carbon fibers 600 mm in length and 7 μm/fiber in diameter are placed, wherein the amounts of silica raw material, silicon carbide raw material, and graphite in a graphite-containing refractory raw material are changed. The size of each graphite-containing refractory is the same as that in Example 2-1, and the production method is the same as the method described in Table 3. The bending strength, fracture energy, erosion resistance, and crack resistance of the graphite-containing refractories according to Examples 14-1 to 14-4 and Comparative Example 14-1 were determined.

Table 15 shows that the graphite-containing refractories according to Examples 14-2 and 14-3, in which the silica raw material constituted 1% to 50% by mass, maintained high bending strength and fracture energy and had both high crack resistance and high erosion resistance. By contrast, the graphite-containing refractory according to Example 14-1, in which the silica raw material constituted less than 1% by mass, had significantly decreased erosion resistance due to the small amount of silica raw material and the large amount of graphite as large as 99.0% by mass. The graphite-containing refractory according to Example 14-4, in which the silica raw material constituted 98.0% by mass, could not prevent cracking caused by thermal spalling and had decreased crack resistance and fracture energy. These results show that when a silica-carbon system graphite-containing refractory is used, the silica raw material preferably constitutes 1% to 50% by mass to increase the bending strength and fracture energy of the graphite-containing refractory.

The following describes the effects of short carbon fibers on the bending strength, breaking strength, erosion resistance, and crack resistance of a graphite-containing refractory containing the short carbon fibers. Table 16 shows the production conditions and evaluation results of tested graphite-containing refractories.

TABLE 16

|  |  | Particle size (mm) | Unit | Example 15-1 | Example 15-2 | Example 15-3 | Example 15-4 | Example 15-5 | Example 15-6 | Example 15-7 | Example 15-8 | Example 15-9 |
|---|---|---|---|---|---|---|---|---|---|---|---|---|
| Refractory raw material | MgO | 3-5 | mass % |  |  |  |  | 10 |  |  |  |  |
|  |  | 1 or more and less than 3 |  |  |  |  |  | 30 |  |  |  |  |
|  |  | 0.3 or more and less than 1 |  |  |  |  |  | 30 |  |  |  |  |
|  |  | 50-200 mesh (0.075 or more and less than 0.3) |  |  |  |  |  | 15 |  |  |  |  |
|  | Flake graphite | — |  |  |  |  |  | 15 |  |  |  |  |
|  | Metallic Si powder | — |  |  |  |  |  | 2.3 |  |  |  |  |
|  | Hexamine | — |  |  |  |  |  | 0.3 |  |  |  |  |
|  | Phenolic resin | — |  |  |  |  |  | 3 |  |  |  |  |
|  | Short carbon fibers | Fiber diameter | μm/fiber | 1 | 1 | 1 | 25 | 50 | 1 | 1 | 1 | 1 |
|  |  | Fiber length | μm | 2 | 2 | 2 | 1000 (1 mm) | 100 | 2000 (2 mm) | 1 | 2 | 2 |
|  |  | Fiber length/fiber diameter | — | 2 | 2 | 2 | 40 | 2 | 2000 | 1 | 2 | 2 |
|  |  | Amount | mass % | 0.10 | 1 | 10 | 1 | 1 | 1 | 1 | 0.05 | 15 |
|  | Total |  | mass % | 105.7 | 106.6 | 115.6 | 106.6 | 106.6 | 106.6 | 106.6 | 105.7 | 120.6 |
| Carbon fiber bundle | Fiber bundle shape | Length | mm |  |  |  |  | 600 |  |  |  |  |
|  |  | Diameter | μm/fiber |  |  |  |  | 7 |  |  |  |  |
|  |  | Number of bundled fibers | Fiber |  |  |  |  | 12000 |  |  |  |  |
|  | Preliminary treatment | Phenolic resin bonding |  |  |  |  |  | Done |  |  |  |  |

TABLE 16-continued

| | Particle size (mm) | Unit | Example 15-1 | Example 15-2 | Example 15-3 | Example 15-4 | Example 15-5 | Example 15-6 | Example 15-7 | Example 15-8 | Example 15-9 |
|---|---|---|---|---|---|---|---|---|---|---|---|
| Charging method | Initial charging amount of refractory raw material relative to mold volume | Vol % | | | | | 10 | | | | |
| | Second and later charging amounts of refractory raw material relative to mold volume | Vol % | | | | | 15 | | | | |
| | Angle of placement of carbon fiber bundle (θ2) | ° | | | | | 90 | | | | |
| | Intervals between carbon fiber bundles | mm | | | | | 5 | | | | |
| | Repetition of charging of raw material and placement of carbon fiber bundles | | | | | | Yes | | | | |
| Timing of placing fiber bundles | | | | | | | After kneading raw materials | | | | |
| Bending strength | | MPa | 28.9 | 29.6 | 29.0 | 29.2 | 23.9 | 24.2 | 23.5 | 23.8 | 23.8 |
| Fracture energy | | kJ/m$^2$ | 56 | 58 | 55 | 56 | 47 | 47 | 45 | 46 | 46 |
| Erosion resistance | | — | 101 | 100 | 100 | 100 | 102 | 102 | 101 | 102 | 102 |
| Crack resistance | | $E_3/E_0$ | 0.71 | 0.74 | 0.72 | 0.72 | 0.67 | 0.69 | 0.67 | 0.68 | 0.68 |

As shown in Table 16, the graphite-containing refractories according to Examples 15-1 to 15-9 are graphite-containing refractories in which carbon fiber bundles each composed of 12000 carbon fibers 600 mm in length and 7 μm/fiber in diameter are placed, wherein graphite-containing refractory raw materials containing different amounts of short carbon fibers with different fiber diameters and fiber lengths are used. The size of each graphite-containing refractory is the same as that in Example 2-1, and the production method is the same as the method described in Table 3. The bending strength, fracture energy, erosion resistance, and crack resistance of the graphite-containing refractories according to Examples 15-1 to 15-9 were determined.

As shown in Table 16, the graphite-containing refractories according to Examples 15-1 to 15-4, in which short carbon fibers with a fiber diameter of 1 to 25 μm/fiber, a fiber length of 2 to 1000 μm, and a ratio of fiber length to fiber diameter of 2 to 40 constituted 0.10% to 10% by mass based on 100% by mass of the graphite-containing refractory raw material, had high bending strength and fracture energy. The graphite-containing refractory according to Example 15-5 containing short carbon fibers with a fiber diameter of more than 45 μm/fiber, more specifically 50 μm/fiber, underwent lamination during pressing due to the large fiber diameter of the short carbon fibers. Thus, the graphite-containing refractory according to Example 15-5 had lower bending strength and fracture energy than the graphite-containing refractories according to Examples 15-1 to 15-4.

The graphite-containing refractory according to Example 15-6 containing short carbon fibers with a fiber length of more than 1000 μm (1 mm), more specifically 2000 μm (2 mm), underwent lamination during pressing due to poor entanglements between the carbon fibers and the refractory raw material. Thus, the graphite-containing refractory according to Example 15-6 had lower bending strength and fracture energy than the graphite-containing refractories according to Examples 15-1 to 15-4.

The graphite-containing refractory according to Example 15-7 containing short carbon fibers with a ratio of fiber length to fiber diameter of less than 2, more specifically 1, had lower bending strength and fracture energy than the graphite-containing refractories according to Examples 15-1 to 15-4 due to poor entanglements between the carbon fibers and the refractory raw material.

The graphite-containing refractory according to Example 15-8, in which short carbon fibers constituted less than 0.10% by mass, more specifically 0.05% by mass, had no suppressive effect of the short carbon fibers on the development of a crack in the refractory due to the excessively small amount of carbon fibers. Thus, the graphite-containing refractory according to Example 15-8 had lower bending strength and fracture energy than the graphite-containing refractories according to Examples 15-1 to 15-4.

The graphite-containing refractory according to Example 15-9, in which short carbon fibers constituted more than 10% by mass, more specifically 15% by mass, underwent lamination during pressing due to no entanglement between the carbon fibers and the refractory raw material. Thus, the graphite-containing refractory according to Example 15-9 had lower bending strength and fracture energy than the graphite-containing refractories according to Examples 15-1 to 15-4.

These results show that short carbon fibers with a fiber diameter of 1 to 25 μm/fiber, a fiber length of 2 to 1000 μm, and a ratio of fiber length to fiber diameter of 2 to 40 preferably constitute 0.10% to 10% by mass based on 100% by mass of a graphite-containing refractory raw material to increase the bending strength and fracture energy of a graphite-containing refractory.

The invention claimed is:

1. A graphite-containing refractory comprising:
carbon fiber bundles 100 mm or more in length placed therein, the carbon fiber bundles being formed of 1000 to 300000 carbon fibers with a fiber diameter of 1 to 45 μm/fiber, and
a magnesia carbon raw material including graphite and a magnesia raw material, the magnesia raw material constituting 20% to 99% by mass of the magnesia carbon raw material and the graphite content constituting 1% to 80% by mass of the magnesia carbon raw material,
wherein end faces of the carbon fiber bundles are a flat shape, and
the carbon fiber bundles are placed such that longitudinal directions of the end faces of the carbon fiber bundles are the same and that an angle between a pressing surface and the longitudinal direction of each end face is 45 degrees or more and 135 degrees or less.

2. The graphite-containing refractory according to claim 1, wherein the carbon fiber bundles are formed of 1000 to 60000 carbon fibers.

3. The graphite-containing refractory according to claim 1, wherein the carbon fiber bundles are formed by bonding using at least one adhesive selected from the group consisting of a phenolic resin, an epoxy resin, a melamine resin, a urea resin, an alkyd resin, an unsaturated polyester resin, polyurethane, thermosetting polyimide, an alumina sol, a silica sol, a zirconia sol, a chromia sol, a titania sol, a magnesia sol, a calcia sol, an yttria sol, pitch, tar, and a starch paste.

4. The graphite-containing refractory according to claim 1, further comprising short carbon fibers constituting 0.10% to 10% by mass based on 100% by mass of the magnesia carbon raw material, the short carbon fibers having a fiber diameter of 1 to 45 μm/fiber, a fiber length of 1 mm or less, and a ratio of fiber length to fiber diameter (fiber length/fiber diameter) of 2 to 1000.

5. A graphite-containing refractory with a graphite content of 1% to 80% by mass, comprising:
carbon fiber bundles 100 mm or more in length placed therein, the carbon fiber bundles being formed of 1000 to 300000 carbon fibers with a fiber diameter of 1 to 45 μm/fiber, and
a graphite-containing refractory raw material including an alumina raw material constituting 10% to 95% by mass of the graphite-containing refractory raw material and a silicon carbide raw material constituting 1% or more by mass of the graphite-containing refractory raw material,
wherein end faces of the carbon fiber bundles are a flat shape, and
the carbon fiber bundles are placed such that longitudinal directions of the end faces of the carbon fiber bundles are the same and that an angle between a pressing surface and the longitudinal direction of each end face is 45 degrees or more and 135 degrees or less.

6. The graphite-containing refractory according to claim 5, wherein the graphite-containing refractory raw material further comprises a silica raw material constituting 1% to 50% by mass of the graphite-containing refractory raw material.

7. The graphite-containing refractory according to claim 5, wherein the carbon fiber bundles are formed of 1000 to 60000 carbon fibers.

8. The graphite-containing refractory according to claim 5, wherein the carbon fiber bundles are formed by bonding using at least one adhesive selected from the group consisting of a phenolic resin, an epoxy resin, a melamine resin, a urea resin, an alkyd resin, an unsaturated polyester resin, polyurethane, thermosetting polyimide, an alumina sol, a silica sol, a zirconia sol, a chromia sol, a titania sol, a magnesia sol, a calcia sol, an yttria sol, pitch, tar, and a starch paste.

9. The graphite-containing refractory according to claim 5, further comprising short carbon fibers constituting 0.10% to 10% by mass based on 100% by mass of the graphite-containing refractory raw material, the short carbon fibers having a fiber diameter of 1 to 45 μm/fiber, a fiber length of 1 mm or less, and a ratio of fiber length to fiber diameter (fiber length/fiber diameter) of 2 to 1000.

10. A graphite-containing refractory with a graphite content of 1% to 80% by mass, comprising:
carbon fiber bundles 100 mm or more in length placed therein, the carbon fiber bundles being formed of 1000 to 300000 carbon fibers with a fiber diameter of 1 to 45 μm/fiber, and
a graphite-containing refractory raw material including a refractory waste constituting 10% to 90% by mass of the graphite-containing refractory raw material, the refractory waste being a crushed used refractory,
wherein end faces of the carbon fiber bundles are a flat shape, and
the carbon fiber bundles are placed such that longitudinal directions of the end faces of the carbon fiber bundles are the same and that an angle between a pressing surface and the longitudinal direction of each end face is 45 degrees or more and 135 degrees or less.

11. The graphite-containing refractory according to claim 10, wherein the carbon fiber bundles are formed of 1000 to 60000 carbon fibers.

12. The graphite-containing refractory according to claim 10, wherein the carbon fiber bundles are formed by bonding using at least one adhesive selected from the group consisting of a phenolic resin, an epoxy resin, a melamine resin, a urea resin, an alkyd resin, an unsaturated polyester resin, polyurethane, thermosetting polyimide, an alumina sol, a silica sol, a zirconia sol, a chromia sol, a titania sol, a magnesia sol, a calcia sol, an yttria sol, pitch, tar, and a starch paste.

13. The graphite-containing refractory according to claim 10, further comprising short carbon fibers constituting 0.10% to 10% by mass based on 100% by mass of the graphite-containing refractory raw material, the short carbon fibers having a fiber diameter of 1 to 45 μm/fiber, a fiber length of 1 mm or less, and a ratio of fiber length to fiber diameter (fiber length/fiber diameter) of 2 to 1000.

* * * * *